(12) United States Patent
Fukutome et al.

(10) Patent No.: US 8,405,888 B2
(45) Date of Patent: *Mar. 26, 2013

(54) IMAGE READING APPARATUS AND IMAGE FORMING APPARATUS

(75) Inventors: Shohichi Fukutome, Osaka (JP); Mitsuharu Yoshimoto, Osaka (JP); Kenji Nakanishi, Osaka (JP); Yasuhiro Suto, Osaka (JP); Hisashi Yamanaka, Osaka (JP); Yoshihisa Yamada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 456 days.

This patent is subject to a terminal disclaimer.

(21) Appl. No.: 12/727,291

(22) Filed: Mar. 19, 2010

(65) Prior Publication Data

US 2010/0245944 A1   Sep. 30, 2010

(30) Foreign Application Priority Data

Mar. 30, 2009   (JP) ................................. 2009-082605

(51) Int. Cl.
*H04N 1/04* (2006.01)
(52) U.S. Cl. ........ 358/488; 358/474; 358/475; 399/220; 382/254
(58) Field of Classification Search .................. 358/474, 358/498, 488, 412, 496, 486, 497, 475, 509; 399/220, 208; 382/254, 274, 275
See application file for complete search history.

(56) References Cited

U.S. PATENT DOCUMENTS

| 5,754,920 | A * | 5/1998 | Tanaka et al. | 399/49 |
| 6,124,950 | A * | 9/2000 | Honda | 358/474 |
| 6,417,932 | B1 * | 7/2002 | Hirota et al. | 358/1.2 |
| 6,721,066 | B2 * | 4/2004 | Hirota et al. | 358/1.9 |
| 7,046,861 | B2 * | 5/2006 | Imaizumi et al. | 382/294 |
| 7,079,685 | B1 * | 7/2006 | Hirota et al. | 382/167 |
| 7,460,279 | B2 * | 12/2008 | Iwasaki | 358/450 |
| 7,652,786 | B2 * | 1/2010 | Nomura | 358/1.5 |
| 2004/0057087 | A1 * | 3/2004 | Wada | 358/497 |
| 2010/0208306 | A1 * | 8/2010 | Fukutome et al. | 358/412 |

FOREIGN PATENT DOCUMENTS

| JP | 03-158066 | 7/1991 |
| JP | 2002-247299 | 8/2002 |

* cited by examiner

*Primary Examiner* — Negussie Worku
(74) *Attorney, Agent, or Firm* — Renner, Otto, Boisselle & Sklar, LLP

(57) ABSTRACT

In regard to a secured original method, an image reading apparatus provided in an image forming apparatus reads a first original guide using an original reading portion and, based on a reading result thereof, changes a reading position of an adjustment sheet in a main scanning direction to enable detection of a difference between a brightness of the first original guide and a brightness of the adjustment sheet. In regard to a moving original method, the image reading apparatus reads a reading member using the original reading portion and, based on a reading result thereof, changes a reading position of an adjustment sheet in a main scanning direction to enable detection of a difference between a brightness of the reading member and a brightness of the adjustment sheet.

19 Claims, 10 Drawing Sheets

IMAGE READING APPARATUS AND IMAGE FORMING APPARATUS

CROSS-REFERENCE TO RELATED APPLICATION

This application claims priority under 35 U.S.C. §119(a) on Patent Application No. 2009-082605 filed in Japan on Mar. 30, 2009, the entire contents of which are hereby incorporated by reference.

BACKGROUND OF THE INVENTION

The present invention relates to image reading apparatuses and image forming apparatuses.

Generally, apparatuses employing methods such as a secured original reading method, in which an original is secured to read an original image, or a moving original reading method, in which the original is caused to move to read an original image, are employed as image reading apparatuses provided in image forming apparatuses such as copiers, facsimile machines, and digital multifunction machines, and image reading apparatuses that are connected to a computer via a communications means such as a network.

Specifically, an image reading apparatus of a secured original reading method reads an image of an original placed on an original table using an original reading portion that moves toward one side of a sub scanning direction while scanning in a main scanning direction orthogonal to the sub scanning direction. Furthermore, an image reading apparatus of a moving original reading method reads an image of an original that is transported toward one side of the sub scanning direction at a predetermined original reading position using an original reading portion that is positioned in a fixed position while scanning in the main scanning direction orthogonal to the sub scanning direction.

For example, common conventional image reading apparatuses include a configuration in which, in an original reading portion provided with a light source unit, in which a light source that irradiates an original and a first mirror are arranged, second and third mirrors, an image forming lens, and a reduction-type image sensor such as a CCD (charge coupled device), reflected light of the original irradiated by the light source is caused to form an image on the image sensor from the first mirror, the second mirror, and the third mirror via the image forming lens, thereby reading an original image, and a configuration in which, in an original reading portion provided with a light source that irradiates an original, and a contact type image sensor such as a CIS (contact image sensor), reflected light of the original irradiated by the light source is caused to be incident on the image sensor, thereby reading an original image.

In reading an original with an image reading apparatus of the secured original method, ordinarily reading of the original image in the sub scanning direction commences after a preset sub scanning reading commencement time has passed from a predetermined scanning position at which the original reading portion scans toward one side of the sub scanning direction. For example, the sub scanning reading commencement time can be set to a time from the movement commencement of the original reading portion moving toward one side of the sub scanning direction, until arriving at an original prescribing edge of a first original guide, which prescribes a placement position of the original in the sub scanning direction. Furthermore, with an image reading apparatus of the secured original method, sometimes reading of the original image in the main scanning direction may commence after a preset main scanning reading commencement time has passed from a predetermined scanning position at which the original reading portion scans toward one side of the main scanning direction. For example, the main scanning reading commencement time can be set to a time from the scanning commencement of the original reading portion moving toward one side of the main scanning direction, until scanning to an original prescribing edge of a second original guide, which prescribes a placement position of the original in the main scanning direction.

When the original guides are installed at a factory, or when the original guides are adjusted or exchanged by an operator such as a service operator in image reading apparatuses of the secured original method, there are discrepancies among image reading apparatuses in the distance between the scanning position of the original reading portion and the original guide due to factors such as discrepancy in the installation position of the original guide and discrepancy of the components, and therefore ordinarily at a time of shipping from the factory or a time of component adjustment or component exchange by an operator such as a service operator, the reading commencement time is adjusted in response to that discrepancy.

On the other hand, in reading an original with an image reading apparatus of the moving original method, ordinarily reading of the original image is configured to commence after a preset sub scanning reading commencement time has passed from detection of a transport timing of the original on an upstream side from the original reading position in the transport direction of the original toward one side of the sub scanning direction (for example, detection of a downstream side edge (leading edge) of the original in the transport direction by an original detection portion such as an original detection sensor). For example, the sub scanning reading commencement time can be set to a time in which the leading edge of the original is transported from a detection position of the transport timing by the original detection portion until the original reading position by the original reading portion.

When the original detection portion and the original reading portion are installed at the factory, or when the original detection portion and the original reading portion are adjusted or exchanged by an operator such as a service operator in image reading apparatuses of the moving original method, there are discrepancies among image reading apparatuses in the distance from the detection position of the transport timing by the original detection portion to the original reading position by the original reading portion due to factors such as discrepancy in the installation position of the original detection portion and the original reading portion and discrepancy of the components, and therefore ordinarily at a time of shipping from the factory or a time of component adjustment or component exchange by an operator such as a service operator, the reading commencement time is adjusted in response to that discrepancy.

For example, these adjustments of the reading commencement time are carried out by transporting an adjustment sheet in the actual image reading apparatus to be adjusted (see JP H3-158066A).

For example, in image reading apparatuses of the secured original method, the sub scanning reading commencement time is adjusted so as to become a sub scanning reading timing adjustment time from movement commencement when the original reading portion moves toward one side of the sub scanning direction until detection of a difference between a brightness of the first original guide and a brightness of a first mark formed on at least an edge of the adjustment sheet in the sub scanning direction by the original reading portion. Furthermore, the main scanning reading commencement time is adjusted so as to become a main scanning reading timing adjustment time from scanning commencement when the original reading portion scans toward one side of the main scanning direction until detection of a difference between a brightness of the second original guide and a brightness of a second mark formed on at least an edge of the adjustment sheet in the main scanning direction by the original reading portion.

However, with image reading apparatuses of the secured original method, problems such as the following arise since the brightness (image density) of the original guide varies according to the product specifications.

FIG. 9 is a diagram for describing conventional adjustment of reading commencement timings based on first and second marks Q1 and Q2 on an adjustment sheet P whose placement position is prescribed by first and second original guides 331 and 332 in an image reading apparatus 100' of the secured original method, and is constituted by FIG. 9A, FIG. 9B, and FIG. 9C. FIG. 9A shows a schematic lateral view thereof. FIG. 9B shows a schematic view as seen from above of the first and second original guides 331 and 332 whose brightness is comparatively dark (blackish). FIG. 9C shows a schematic view as seen from above of the first and second original guides 331 and 332 whose brightness is comparatively light (whitish).

In the image reading apparatus 100' of the secured original method, the placement position of the original or the adjustment sheet P in the sub scanning direction Y is prescribed by the first original guide 331, which is arranged at an upstream side of the original in the reading direction Y1 of the sub scanning direction (direction of arrow Y in the diagram). Furthermore, the placement position of the original or the adjustment sheet P in the main scanning direction X may also be prescribed by the second original guide 332, which is arranged at an upstream side of the original in the reading direction X1 of the main scanning direction (direction of arrow X in the diagram).

The first mark Q1 is formed on at least a leading edge P' of the adjustment sheet P in the sub scanning direction Y. Furthermore, the second mark Q2 is formed on at least an edge P''' of the adjustment sheet P in the main scanning direction X.

Each of the first and second original guides 331 and 332 is formed (see FIG. 9C) such that at least its surface has a brightness (a brightness (generally white) having a difference from the brightness of the marks Q1 and Q2 that is identifiable when read by the original reading portion 200) lighter than the brightness (generally black) of the first and second marks Q1 and Q2. This enables the image reading apparatus 100' to identify a difference between the brightness of the first and second original guides 331 and 332 and the brightness of the adjustment sheet P using the original reading portion 200.

And, as shown in FIG. 9C, a sub scanning reading commencement time Ta is adjusted in the sub scanning direction Y according to the first mark Q1 on the adjustment sheet P.

Generally, in adjusting the reading commencement timing in the sub scanning direction Y using the adjustment sheet P, a time T1a for adjusting timing of sub scanning reading is measured, which is from a predetermined scanning commencement (see α1 in FIG. 9) in the sub scanning direction Y of the original reading portion 200 until when a difference between the brightness of the first original guide 331 and the brightness of the adjustment sheet P is detected by the original reading portion 200 (see β1 in FIG. 9). Based on the time T1a for adjusting timing of sub scanning reading that is measured in this manner, the sub scanning reading commencement time Ta is adjusted. For example, in a case where the sub scanning reading commencement time Ta is a time from a movement commencement α1 of the original reading portion 200 in the sub scanning direction Y until arriving at a boundary position β1 between an original prescribing edge 331a of the first original guide 331 and the original, the sub scanning reading commencement time Ta is adjusted so that the sub scanning reading commencement time Ta becomes the time T1a for adjusting timing of sub scanning reading obtained through measurement.

Furthermore, this may be configured such that a main scanning reading commencement time Tb is adjusted in the main scanning direction X according to the second mark Q2 on the adjustment sheet P.

Generally, in adjusting the reading commencement timing in the main scanning direction X using the adjustment sheet P, a time T1b for adjusting timing of main scanning reading is measured, which is from a predetermined scanning commencement (see α2 in FIG. 9) in the main scanning direction X of the original reading portion 200 until when a difference between the brightness of the second original guide 332 and the brightness of the adjustment sheet P is detected by the original reading portion 200 (see β2 in FIG. 9). Based on the time T1b for adjusting timing of main scanning reading that is measured in this manner, the main scanning reading commencement time Tb is adjusted. For example, in a case where the main scanning reading commencement time Tb is a scanning time from a scanning commencement α2 of the original reading portion 200 in the main scanning direction X until a boundary position β2 between an original prescribing edge 332a of the second original guide 332 and the original, the main scanning reading commencement time Tb is adjusted so that the main scanning reading commencement time Tb becomes the time T1b for adjusting timing of main scanning reading obtained through measurement.

In a configuration such as this, due to a relationship of a destination of a product or product specifications such as product design, there are products in which the brightness of the first and second original guides 331 and 332 is set to a brightness comparatively similar to the first and second marks Q1 and Q2 of the adjustment sheet P (see FIG. 9B). When this happens, there are cases where a difference between the brightness of the first and second original guides 331 and 332 and the brightness of the first and second marks Q1 and Q2 cannot be identified with the adjustment method of FIG. 9C.

In these cases, as shown in FIG. 9B, it is necessary to identify a difference between the brightness of the first and second original guides 331 and 332 and a brightness other than the first and second marks Q1 and Q2 of the adjustment sheet P.

It should be noted that in a case where a blackish first original guide 331 is used, a sub scanning direction Y edge 333a of a white standard board 333 may be read, which is arranged on an upstream side in the sub scanning direction Y from the original prescribing edge 331a of the first original guide 331, then a measured time t2a, which is from the sub scanning direction Y edge 333a of the white standard board 333 until the original prescribing edge 331a of the first original guide 331, may be determined in advance by testing or the like, and a scanning time ta1 may be measured, which is from the scanning commencement (for example, movement commencement) α1 of the original reading portion 200 until a time when a difference between the brightness of the white standard board 333 and the brightness of the first original guide 331 is detected by the original reading portion (see Y1 in FIG. 9), thereby setting the sub scanning reading commencement time Ta as a total time of the scanning time ta1 and the measured time ta2.

In any case, there is a problem that the control configuration for adjusting the reading timing of originals G must be changed for each product due to the varying brightness of the first and second original guides 331 and 332.

On the other hand, in image reading apparatuses of the moving original method, the sub scanning reading commencement time is adjusted so as to become a sub scanning reading timing adjustment time from detection by an original detection portion of a leading edge of an adjustment sheet that is transported by the original transport portion on an upstream side in the transport direction from the original reading position until detection of a difference between a brightness of a reading member, which is arranged on an opposite side from the reading side by the original reading portion through the original transport path and a brightness of a mark formed on at least an edge of the adjustment sheet in the sub scanning direction by the original reading portion.

With the image reading apparatus of the moving original method, problems such as the following arise since the brightness (image density) of the reading member varies according to the product specifications.

FIG. 10 is a diagram for describing conventional adjustment of reading commencement timings based on a mark Q1 on an adjustment sheet P transported in an image reading apparatus 100" of the moving original method, and is constituted by FIG. 10A, FIG. 10B, and FIG. 10C. FIG. 10A shows a schematic lateral view thereof. FIG. 10B shows a schematic view as seen from below of a reading member 318 whose brightness is comparatively dark (blackish). FIG. 10C shows a schematic view as seen from below of a reading member 318 whose brightness is comparatively light (whitish).

In the image reading apparatus 100" of the moving original method, a reading member 318 is provided on an opposite side from the reading side of the original reading position β1 with an original transport path 303 in between, and this is read by the original reading portion 200 at a non-transport time of the original.

The reading member 318 is formed (see FIG. 10C) such that at least its surface has a brightness (a brightness (generally white) having a difference from the brightness of the mark Q1 that is identifiable when read by the original reading portion 200) lighter than the brightness (generally black) of the mark Q1. This enables the image reading apparatus 100" to identify a difference between the brightness of the reading member 318 and the brightness of the adjustment sheet P using the original reading portion 200.

And, as shown in FIG. 10C, a sub scanning reading commencement time Ta is adjusted in the sub scanning direction Y according to the mark Q1 on the adjustment sheet P.

Generally, in adjusting the reading commencement timing in the sub scanning direction Y using the adjustment sheet P, the time T1$a$ for adjusting timing of sub scanning reading is measured, which is from detection by the original detection sensor 320 of downstream side (leading edge portion) edge P' of the adjustment sheet P transported in the transport direction Y3 by an unshown original transport portion on an upstream side of the transport direction Y3 from the original reading position β1 until reading of the leading edge P' in the sub scanning direction Y of the mark Q1 on the adjustment sheet P by the original reading portion 200. Based on the time T1$a$ for adjusting timing of sub scanning reading that is measured in this manner, the sub scanning reading commencement time Ta is adjusted. For example, in a case where the sub scanning reading commencement time Ta is a time from detection of the leading edge of the original by the original detection sensor 320 until reading of the leading edge of the original by the original reading portion 200, the sub scanning reading commencement time Ta is adjusted so that the sub scanning reading commencement time Ta becomes the time T1$a$ for adjusting timing of sub scanning reading obtained through measurement.

In a configuration such as this, due to a relationship of a destination of a product or product specifications such as product design, there are products in which the brightness of the reading member 318 is set to a brightness comparatively similar to the mark Q1 of the adjustment sheet P (see FIG. 10B). When this happens, there are cases where a difference between the brightness of the reading member 318 and the brightness of the mark Q1 cannot be identified with the adjustment method of FIG. 10C.

In these cases, as shown in FIG. 10B, it is necessary to identify a difference between the brightness of the reading member 318 and a brightness other than the mark Q1 of the adjustment sheet P.

Accordingly, there is a problem that the control configuration for adjusting the reading timing of originals G must be changed for each product due to the varying brightness of the reading member 318.

Thus, one issue of the present invention is to provide an image reading apparatus of a secured original method, in which the reading timing of an original can be reliably adjusted even when the brightness of the original guide varies due to product specifications without changing the control configuration for each product, and an image forming apparatus including this.

Furthermore, another issue of the present invention is to provide an image reading apparatus of a moving original method, in which the reading timing of an original can be reliably adjusted even when the brightness of the reading member varies due to product specifications without changing the control configuration for each product, and an image forming apparatus including this.

SUMMARY OF THE INVENTION

In order to address the aforementioned issues, the present invention provides an image reading apparatus, which is provided with an original reading commencement adjusting portion as described below, and an image forming apparatus that is provided with this image reading apparatus. A following first embodiment and second embodiment are included as embodiments of an image reading apparatus according to the present invention. Accordingly, first, description is given regarding an image reading apparatus of a first embodiment according to the present invention.

(1) Image Reading Apparatus of First Embodiment

An image reading apparatus according to a first embodiment of the present invention is provided with an original reading portion that reads an image of an original placed on an original table by moving toward one side of a sub scanning direction while scanning in a main scanning direction orthogonal to the sub scanning direction, a first original guide that prescribes a placement position of an original in the sub scanning direction, and an original reading commencement adjusting portion that adjusts a reading commencement timing of the original in the sub scanning direction using an adjustment sheet having a first mark formed on at least an edge in the sub scanning direction, wherein the original reading commencement adjusting portion reads the first original guide using the original reading portion and, based on a reading result thereof, changes a reading position of the adjustment sheet in the main scanning direction to enable detection by the original reading portion of a difference between a brightness of the first original guide and a brightness of the adjustment sheet.

With an image reading apparatus according to the first embodiment of the present invention and an image forming apparatus provided with this, the original reading commencement adjusting portion reads the first original guide using the original reading portion and, based on a reading result thereof, changes a reading position of the adjustment sheet in the main scanning direction to enable detection by the original reading portion of a difference between a brightness of the first original guide and a brightness of the adjustment sheet, and therefore the reading timing of an original can be reliably adjusted in the sub scanning direction even when the brightness of the first original guide varies due to product specifications without changing the control configuration for each product.

In the above-described configuration, a reading commencement timing of the original in the sub scanning direction may be adjusted based on a time for adjusting timing of sub scanning reading, which is from a predetermined scanning position at which the original reading portion scans to one side of the sub scanning direction until when a difference is detected by the original reading portion between a brightness of the first original guide and a brightness of the adjustment sheet. It should be noted that the predetermined scanning position may be a movement commencement position of the original reading portion at which movement commences from a stationary state, and may be a predetermined position during movement of the original reading portion.

In the above-described configuration, a second original guide may be further provided that prescribes a placement position of an original in the main scanning direction, and the adjustment sheet may be further provided with a second mark formed on at least an edge in the main scanning direction.

In this case, the original reading commencement adjusting portion can be configured to further adjust a reading commencement timing of the original in the main scanning direction using the adjustment sheet. And in the above-described configuration, the original reading commencement adjusting portion may read the second original guide using the original reading portion and, based on a reading result thereof, change a reading position of the adjustment sheet in the sub scanning direction to enable detection by the original reading portion of a difference between a brightness of the second original guide and a brightness of the adjustment sheet.

With this feature, the original reading commencement adjusting portion reads the second original guide using the original reading portion and, based on a reading result thereof, changes a reading position of the adjustment sheet in the sub scanning direction to enable detection by the original reading portion of a difference between a brightness of the second original guide and a brightness of the adjustment sheet, and therefore the reading timing of an original can be reliably adjusted in the main scanning direction even when the brightness of the original guide varies due to product specifications without changing the control configuration for each product.

In the above-described configuration, a reading commencement timing of the original in the main scanning direction may be adjusted based on a time for adjusting timing of main scanning reading, which is from a predetermined scanning position at which the original reading portion scans to one side of the main scanning direction until when a difference is detected by the original reading portion between a brightness of the second original guide and a brightness of the adjustment sheet.

In the above-described configuration, a threshold may be set in advance, which is a value between a reading result of the first mark of the adjustment sheet by the original reading portion and a reading result of other than the first mark of the adjustment sheet by the original reading portion, and the original reading commencement adjusting portion, upon determining that a reading result of the first original guide by the original reading portion is on a reading result side of the first mark with reference to the threshold, may read an edge other than the first mark of the adjustment sheet.

With this feature, a difference can be reliably identified by the original reading portion between a brightness of the first original guide and a brightness of other than the first mark of the adjustment sheet at a time when the brightness of the first original guide and the brightness of the first mark of the adjustment sheet are comparatively similar.

Furthermore, in a case where the second original guide is provided, a threshold may be set in advance, which is a value between a reading result of the second mark of the adjustment sheet by the original reading portion and a reading result of other than the second mark of the adjustment sheet by the original reading portion, and the original reading commencement adjusting portion, upon determining that a reading result of the second original guide by the original reading portion is on a reading result side of the second mark with reference to the threshold, may read an edge other than the second mark of the adjustment sheet.

With this feature, a difference can be reliably identified by the original reading portion between a brightness of the second original guide and a brightness of other than the second mark of the adjustment sheet at a time when the brightness of the second original guide and the brightness of the second mark of the adjustment sheet are comparatively similar.

In the above-described configuration, a threshold may be set in advance, which is a value between a reading result of the first mark of the adjustment sheet by the original reading portion and a reading result of other than the first mark of the adjustment sheet by the original reading portion, and the original reading commencement adjusting portion, upon determining that a reading result of the first original guide by the original reading portion is not on a reading result side of the first mark with reference to the threshold, may read an edge of the first mark of the adjustment sheet.

With this feature, a difference can be reliably identified by the original reading portion between a brightness of the first original guide and a brightness of the first mark of the adjustment sheet at a time when the brightness of the first original guide and the brightness of the first mark of the adjustment sheet are comparatively different.

Furthermore, in a case where the second original guide is provided, a threshold may be set in advance, which is a value between a reading result of the second mark of the adjustment sheet by the original reading portion and a reading result of other than the second mark of the adjustment sheet by the original reading portion, and the original reading commencement adjusting portion, upon determining that a reading result of the second original guide by the original reading portion is not on a reading result side of the second mark with reference to the threshold, may read an edge of the second mark of the adjustment sheet.

With this feature, a difference can be reliably identified by the original reading portion between a brightness of the second original guide and a brightness of the second mark of the adjustment sheet at a time when the brightness of the second original guide and the brightness of the second mark of the adjustment sheet are comparatively different.

Next, description is given regarding an image reading apparatus of a second embodiment according to the present invention.

(2) Image Reading Apparatus of Second Embodiment

An image reading apparatus according to a second embodiment of the present invention is provided with an original reading portion that reads an image of an original, which is transported toward one side of a sub scanning direction, at a predetermined original reading position by scanning in a main scanning direction orthogonal to the sub scanning direction, a reading member arranged on an opposite side from a side of reading by the original reading portion through an original transport path, and an original reading commencement adjusting portion that adjusts a reading commencement timing of the original in the sub scanning direction using an adjustment sheet having a mark formed on at least an edge in the sub scanning direction, wherein the original reading commencement adjusting portion reads the reading member using the original reading portion and, based on a reading result thereof, changes a reading position of the adjustment sheet in the main scanning direction to enable detection by the original reading portion of a difference between a brightness of the reading member and a brightness of the adjustment sheet.

With an image reading apparatus according to the second embodiment of the present invention and an image forming apparatus provided with this, the original reading commencement adjusting portion reads the reading member using the original reading portion and, based on a reading result thereof, changes a reading position of the adjustment sheet in the main scanning direction to enable detection by the original reading portion of a difference between a brightness of the reading member and a brightness of the adjustment sheet, and therefore the reading timing of an original can be reliably adjusted in the sub scanning direction even when the brightness of the reading member varies due to product specifications without changing the control configuration for each product.

In the above-described configuration, the original reading commencement adjusting portion may adjust a reading commencement timing of the original in the sub scanning direction based on a time for adjusting timing of sub scanning reading, which is from detection of a transport timing of the adjustment sheet at an upstream side from the original reading position in the transport direction of the original toward one side of the sub scanning direction until when a difference is detected by the original reading portion between a brightness of the reading member and a brightness of the adjustment sheet.

In the above-described configuration, a threshold may be set in advance, which is a value between a reading result of the mark of the adjustment sheet by the original reading portion and a reading result of other than the mark of the adjustment sheet by the original reading portion, and the original reading commencement adjusting portion, upon determining that a reading result of the reading member by the original reading portion is on a reading result side of the mark with reference to the threshold, may read an edge other than the mark of the adjustment sheet.

With this feature, a difference can be reliably identified by the original reading portion between a brightness of the reading member and a brightness of other than the mark of the adjustment sheet at a time when the brightness of the reading member and the brightness of the mark of the adjustment sheet are comparatively similar.

In the above-described configuration, a threshold may be set in advance, which is a value between a reading result of the mark of the adjustment sheet by the original reading portion and a reading result of other than the mark of the adjustment sheet by the original reading portion, and the original reading commencement adjusting portion, upon determining that a reading result of the reading member by the original reading portion is not on a reading result side of the mark with reference to the threshold, may read an edge of the mark of the adjustment sheet.

With this feature, a difference can be reliably identified by the original reading portion between a brightness of the reading member and a brightness of the mark of the adjustment sheet at a time when the brightness of the reading member and the brightness of the mark of the adjustment sheet are comparatively different.

In the above-described configuration, the above-described effects can be obtained favorably even in a case of reading original images of both the front and back surfaces. For example, the original reading portion may be provided on both sides of the original transport path with the original transport path in between.

In an image reading apparatus according to the above-described first embodiment and the second embodiment of the present invention, a representative example of the adjustment sheet that can be given includes an adjustment sheet on which the mark has a brightness darker than a predetermined mid-tone brightness, and other than the mark has a brightness of or lighter than the mid-tone brightness.

In an image reading apparatus according to the above-described first embodiment and the second embodiment of the present invention, it is preferable that on the adjustment sheet, at least two or more of the marks are provided with an interval therebetween.

With this feature, even in a case where the adjustment sheet has been read in a slanted state, discrepancies in the reading timings can be equalized by averaging the reading times of the marks by the original reading portion.

In an image reading apparatus according to the above-described first embodiment and the second embodiment of the present invention, the adjustment sheet may be a sheet printed by an image forming apparatus that is provided with the image reading apparatus.

It should be noted that "brightness" as referred to in the present invention signifies, of course, not only the shading of white and black, but also a degree of color density.

BRIEF DESCRIPTION OF THE DRAWINGS

FIG. 7A is a schematic lateral view thereof, FIG. 7B is a schematic view as seen from above of the first and second original guides whose brightness is comparatively dark, and shows a timing chart of output signals of a first image sensor in this case, and FIG. 7C is a schematic view as seen from above of the first and second original guides whose brightness is comparatively light, and shows a timing chart of output signals of a first image sensor in this case.

FIG. 8A is a schematic lateral view thereof, FIG. 8B is a schematic view as seen from below of first and second reading members whose brightness is comparatively dark, and shows a timing chart of output signals of first and second image sensors in this case, and FIG. 8C is a schematic view as seen from below of first and second reading members whose brightness is comparatively light, and shows a timing chart of output signals of first and second image sensors in this case.

FIG. 9A is a schematic lateral view thereof, FIG. 9B is a schematic view as seen from above of the first and second original guides whose brightness is comparatively dark (blackish), and FIG. 9C is a schematic view as seen from above of the first and second original guides whose brightness is comparatively light (whitish).

FIG. 10A is a schematic lateral view thereof, FIG. 10B is a schematic view as seen from below of a reading member whose brightness is comparatively dark (blackish), and FIG. 10C is a schematic view as seen from below of a reading member whose brightness is comparatively light (whitish).

Figure 1:
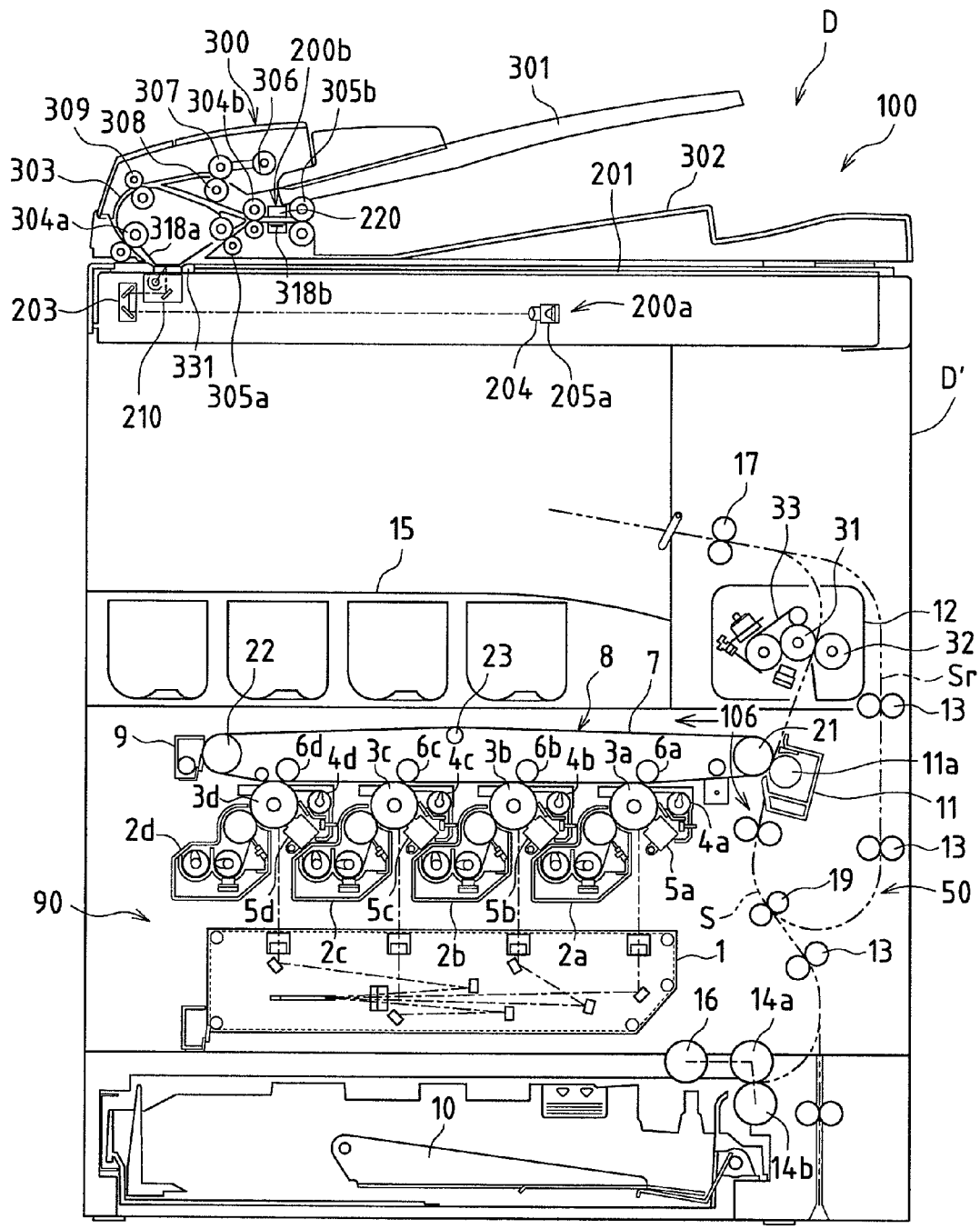
FIG. 1 is a lateral view that schematically shows an image forming apparatus provided with an image reading apparatus according to an embodiment of the present invention.

DESCRIPTION OF REFERENCE NUMERALS 100 image reading apparatus
200a first original reading portion
200b second original reading portion
201 platen glass (one example of an original table)
303 original transport path
318a first reading member
318b second reading member
331 first original guide
332 second original guide
D image forming apparatus
G original
P adjustment sheet
P' sub scanning direction leading edge
Q1 first mark
Q2 second mark
T1a time for adjusting timing of sub scanning reading
T1b time for adjusting timing of main scanning reading
X main scanning direction
X1 main scanning reading direction (one side of main scanning direction)
Y sub scanning direction
Y1 sub scanning reading direction (one side of sub scanning direction)
Y3 transport direction (one side of sub scanning direction)
α1 predetermined scanning position in sub scanning direction
α1 predetermined scanning position in main scanning direction
β1 original reading position

DESCRIPTION OF PREFERRED EMBODIMENTS

Hereinafter, an embodiment of the present invention is described with reference to the accompanying drawings. It should be noted that the following embodiment is a single specific example of the present invention and does not limit the scope of the present invention.

FIG. 1 is a lateral view that schematically shows an image forming apparatus D provided with an image reading apparatus 100 according to an embodiment of the present invention.

The image forming apparatus D shown in FIG. 1 is provided with an image reading apparatus 100 that reads an image of an original G (see FIG. 2 or the like, which is described later), and an apparatus main unit D' that records and forms a color or monochrome image of the original G, which has been read by the image reading apparatus 100, on a recording sheet such as plain paper.

Regarding the Overall Configuration of the Image Forming Apparatus D

The apparatus main unit D' of the image forming apparatus D is provided with an exposure device 1, development devices 2 (2a, 2b, 2c, and 2d), photosensitive drums 3 (3a, 3b, 3c, and 3d) that act as image carriers, charging devices 5 (5a, 5b, 5c, and 5d), cleaner devices 4 (4a, 4b, 4c, and 4d), an intermediate transfer belt device 8 that includes intermediate transfer rollers 6 (6a, 6b, 6c, and 6d) acting as transfer portions, a fixing device 12, a sheet transport device 50, a paper feeding tray 10 that acts as a paper feeding portion, and a paper discharge tray 15 that acts as a paper discharge portion.

Image data handled in the apparatus main unit D' of the image forming apparatus 100 corresponds to color images using each of the colors black (K), cyan (C), magenta (M), and yellow (Y), or corresponds to a monochrome image using a single color (for example, black). Accordingly, four each of the development devices 2 (2a, 2b, 2c, and 2d), the photosensitive drums 3 (3a, 3b, 3c, and 3d), the charging devices 5 (5a, 5b, 5c, and 5d), the cleaner devices 4 (4a, 4b, 4c, and 4d), and the intermediate transfer rollers 6 (6a, 6b, 6c, and 6d) are provided to form four types of images according to the colors, with the suffix symbol "a" assigned for black, the suffix symbol "b" for cyan, the suffix symbol "c" for magenta, and the suffix symbol "d" for yellow, thereby configuring four image stations corresponding to the colors. Hereinafter, the suffix symbols a to d are omitted in describing structural members of the apparatus main unit D' of the image forming apparatus D.

The photosensitive drums 3 are arranged substantially at a vertical direction center of the apparatus main unit D'. The charging devices 5 are charging portions for uniformly charging the surfaces of the photosensitive drums 3 to a predetermined electric potential and in addition to contact types such as roller and brush charging devices, charger-type charging devices are also used as the charging devices 5.

Here, the laser exposure device 1 is a laser scanning unit (LSU) provided with a laser diode and reflector mirrors, and exposes the surfaces of the charged photosensitive drums 3 in response to image data to form electrostatic latent images on the surfaces corresponding to the image data.

The development apparatuses 2 use toner of each color (K, C, M, and Y) to develop the electrostatic latent images formed on the photosensitive drums 3. The cleaner devices 4 remove and collect toner that is residual on the surfaces of the photosensitive drums 3 after development and image transfer.

In addition to the intermediate transfer rollers 6, the intermediate transfer belt device 8 positioned above the photosensitive drums 3 is provided with an intermediate transfer belt 7, which acts as an intermediate transfer member, an intermediate transfer belt drive roller 21, an idler roller 22, a tension roller 23, and an intermediate transfer belt cleaning device 9.

The intermediate transfer belt 7 spans in a tensioned state and is supported by roller members such as the intermediate transfer belt drive roller 21, the intermediate transfer rollers 6, the idler roller 22, and the tension roller 23. The intermediate transfer belt 7 is caused to move circumferentially (rotate) there-around in a predetermined sheet transport direction (arrow direction in the diagram).

The intermediate transfer rollers 6 are rotatably supported on an inner side of the intermediate transfer belt 7, and apply a transfer bias for transferring the toner images on the photosensitive drums 3 onto the intermediate transfer belt 7.

The intermediate transfer belt 7 is arranged so as to contact each of the photosensitive drums 3 and forms a color toner image (toner image of each color) by successively superimposing and transferring the toner image on the surface of each of the photosensitive drums 3 onto the intermediate transfer belt 7. Here, the transfer belt 7 is formed as an endless belt using a film of a thickness in a range of 100 μm to 150 μm.

Transfer of the toner images from the photosensitive drums 3 to the intermediate transfer belt 7 is carried out by the intermediate transfer rollers 6 that are in contact with the inner side (rear surface) of the intermediate transfer belt 7. A high voltage transfer bias (for example, a high voltage of opposite polarity (+) to the charge polarity (−) of the toner) is applied to the intermediate transfer rollers 6 to achieve transfer of the toner images. Here, the intermediate transfer rollers 6 are based on metal (for example stainless steel) shafts having a diameter of 8 to 10 mm and the surfaces thereof are covered by a conductive elastic material (for example, EPDM and urethane foam or the like). With this conductive elastic material, it is possible to apply a uniform high voltage to the recording sheet.

The apparatus main unit D' of the image forming apparatus D is further provided with a secondary transfer device 11, which includes a transfer roller 11a that acts as a transfer portion. The transfer roller 11a is arranged on an opposite side (outer side) to the intermediate transfer belt drive roller 21 through the intermediate transfer belt 7, and contacts a surface (front surface) of the intermediate transfer belt 7.

As described above, the toner image on the surface of each of the photosensitive drums 3 is layered onto the intermediate transfer belt 7 to become a color toner image indicated by image data. The layered toner images of each color are transported with the intermediate transfer belt 7 then transferred onto a recording sheet by the secondary transfer device 11.

The intermediate transfer belt 7 and the transfer roller 11a of the secondary transfer device 11 press against each other to form a nip region. Furthermore, a voltage (for example a high voltage of an opposite polarity (+) to the charge polarity (−) of the toner) is applied to the transfer roller 11a of the secondary transfer device 11 in order for the toner image of each color on the intermediate transfer belt 7 to be transferred to the recording sheet. Further still, in order to steadily obtain the nip region, either the transfer roller 11a of the secondary transfer device 11 or the intermediate transfer belt drive roller 21 is provided as a hard material (a metal or the like) and the other of these is provided as a soft material such as an elastic roller (elastic rubber roller or foam resin roller or the like).

Furthermore, sometimes the toner images on the intermediate transfer belt 7 are not completely transferred onto the recording sheet by the secondary transfer device 11 and there is residual toner on the intermediate transfer belt 7, and this residual toner is a cause of mixed toner colors occurring at subsequent steps. To solve this cause, the apparatus main unit D' is provided with the intermediate transfer belt cleaning device 9, and residual toner is removed and collected by the intermediate transfer belt cleaning device 9. In the intermediate transfer belt cleaning device 9, a cleaning blade is provided for example as a cleaning member that contacts the intermediate transfer belt 7, and residual toner can be removed and collected by this cleaning blade. The idler roller 22 supports the intermediate transfer belt 7 from the inner side (rear side), and the cleaning blade touches the intermediate transfer belt 7 so as to apply pressure from the outside toward the idler roller 22.

The paper feed tray 10 is a tray for storing recording sheets and is provided below an image forming portion 90 of the apparatus main unit D'. Furthermore, the paper discharge tray 15 arranged above the image forming portion 90 is a tray for loading face down the recording sheets on which printing has been performed.

Furthermore, the sheet transport device 50 is provided in the apparatus main unit D' for sending the recording sheets in the paper feeding tray 10 to the paper discharge tray 15 via the secondary transfer device 11 and the fixing device 12. The sheet transport device 50 has a sheet transport path S, which has an S shape, and transport members such as a pickup roller 16, a paper feeding roller 14a, a separation roller 14b, transport rollers 13, a pre-registration roller pair 19, a registration roller pair 106, the fixing device 12, and discharge rollers 17 are arranged along the sheet transport path S.

The pickup roller 16 is provided at an end portion on the downstream side in the sheet transport direction of the paper feeding tray 10, and is a draw-in roller that supplies recording sheets sheet by sheet from the paper feeding tray 10 to the sheet transport path S. The paper feeding roller 14a transports recording sheets to the sheet transport path S while separating the recording sheets sheet by sheet by causing the recording sheets to pass between itself and the separation roller 14b. The transport rollers 13 and the pre-registration roller pair 19 are small rollers for facilitating and assisting transport of the recording sheets. The transport rollers 13 are provided in multiple locations along the sheet transport path S. The pre-registration roller pair 19 is provided close to the upstream side of the registration roller pair 106 in the sheet transport direction, and is configured to transport recording sheets to the registration roller pair 106.

The fixing device 12 receives the recording sheet on which a toner image has been transferred, and transports this recording sheet sandwiched between a heat roller 31 and a pressure roller 32.

The heat roller 31 undergoes temperature control so as to achieve a predetermined fixing temperature, and has a function of melting, mixing, and pressing the toner image that has been transferred onto the recording sheet to thermally fix the toner image to the recording sheet by applying thermocompression to the recording sheet along with the pressure roller 32. Furthermore, an external heating belt 33 is provided in the fixing device 12 for externally heating the heat roller 31.

After the toner images of each color have been fixed, the recording sheet is discharged to the paper discharge tray 15 by the discharge rollers 17.

It should be noted that it is also possible to form a monochrome image by using at least only one of the four image forming stations and transferring the monochrome image to the intermediate transfer belt 7 of the intermediate transfer belt device 8. As with the color image, the monochrome image is transferred from the intermediate transfer belt 7 to the recording sheet and fixed to the recording sheet.

Furthermore, when carrying out image forming not only on the front side of the recording sheet but on both sides, after the image on the front side of the recording sheet is fixed by the fixing device 12 and while the recording sheet is being transported by the discharge rollers 17 on the sheet transport path S, the discharge rollers 17 are made to stop and then rotate in reverse, thereby bringing the recording sheet into a front-back inversion route Sr. The front and back of the recording sheet are inverted by passing through the front-back inversion route Sr, then the recording sheet is again guided to the registration roller pair 106 and an image is recorded and fixed on the back side of the recording sheet in a same manner as the front side of the recording sheet, after which the recording sheet is discharged to the paper discharge tray 15.

Regarding the Overall Configuration of the Image Reading Apparatus 100

Figure 2:
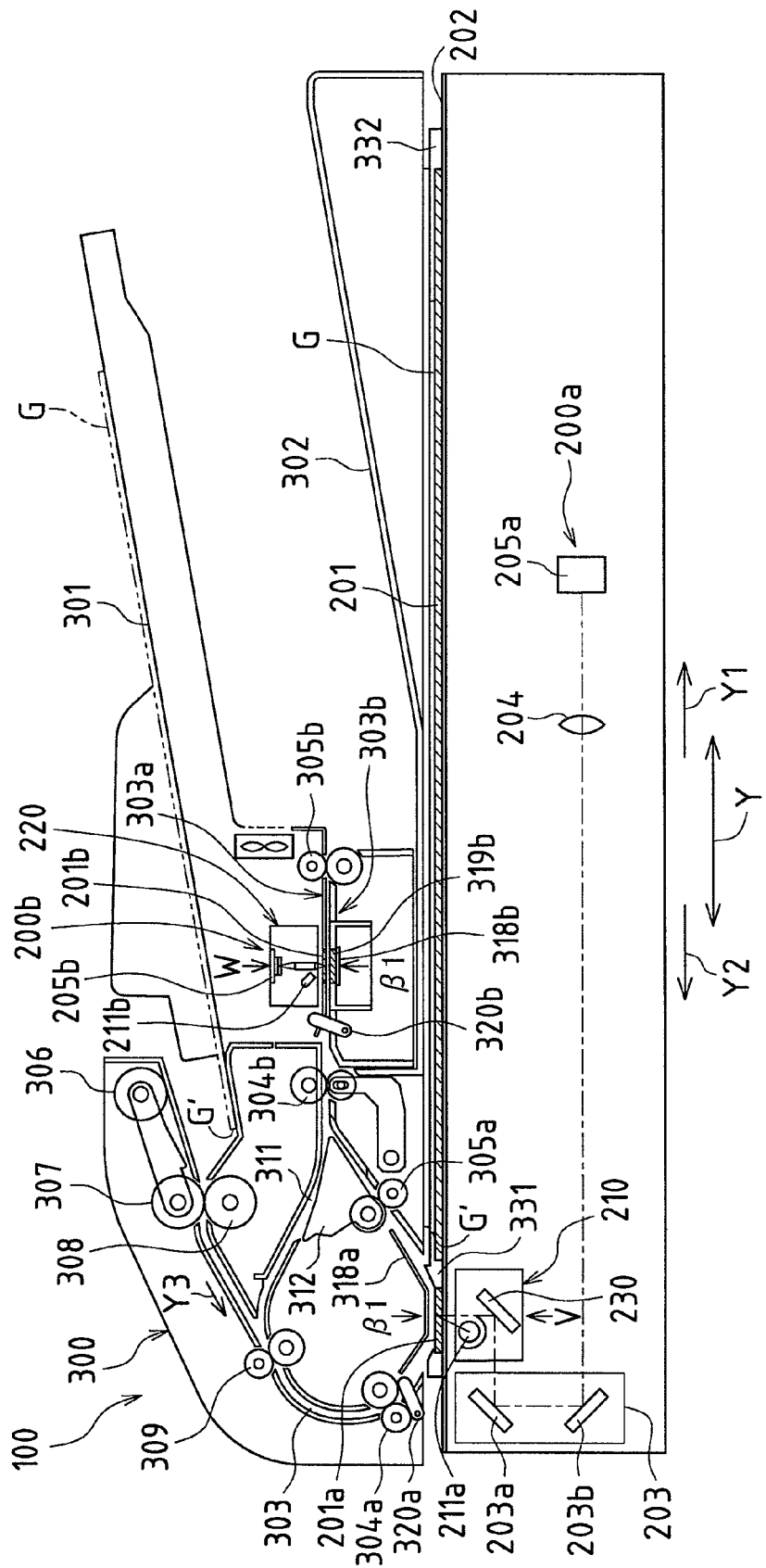
FIG. 2 is a schematic profile view of the image reading apparatus shown in FIG. 1.

FIG. 2 is a schematic profile view of the image reading apparatus 100 shown in FIG. 1. The image reading apparatus 100 shown in FIG. 1 and FIG. 2 is configured to read an original image by securing an original G using a secured original method as well as to read an original image by causing an original G to move using a moving original method.

That is, the image reading apparatus 100 is provided with a secured original reading configuration in which the original G, whose placement position is prescribed by original guides 331 and 332, is irradiated through a platen glass 201 by a first light source 211*a* of a first original reading portion 200*a* while placed on the platen glass 201, which is one example of an original table, then while a light source unit 210, in which the first light source 211*a* is provided, is caused to move in a reading direction Y1, which is one of the sub scanning directions (direction of arrow Y in FIG. 2), reflected light from the original G, which has been irradiated by the first light source 211*a*, is scanned in a reading direction X1, which is one of the main scanning directions (see direction of arrow X in FIG. 4 to FIG. 8, described later) orthogonal to the sub scanning direction Y by a first image sensor 205*a*, thereby reading an original image. Furthermore, the image reading apparatus 100 is provided with a first moving original reading configuration in which the original G, which is transported by an original transport portion 300 in a predetermined transport direction Y3, which is one of the sub scanning directions Y, to pass over a first reading glass 201*a*, is irradiated through the first reading glass 201*a* by the first light source 211*a* of the light source unit 210, which is stopped in a predetermined position V in the first original reading portion 200*a*, and reflected light from the original G, which has been irradiated by the first light source 211*a*, is scanned by the first image sensor 205*a* in the main scanning reading direction X1, thereby reading an original image. Further still, the image reading apparatus 100 is provided with a second moving original reading configuration in which the original G, which is transported by the original transport portion 300 in a transport direction Y3 to pass over a second reading glass 201*b*, is irradiated through the second reading glass 201*b* by a second light source 211*b* of a reading unit 220, which is secured in a predetermined position W in a second original reading portion 200*b*, and reflected light from the original G, which has been irradiated by the second light source 211*b*, is scanned in the main scanning reading direction X1 by a second image sensor 205*b* of the reading unit 220, thereby reading an original image. It should be noted that FIG. 1 and FIG. 2 show a state in which the first light source unit 210 is positioned in the predetermined position V.

Specifically, the first original reading portion 200*a* is provided with the platen glass 201, the first original guide 331, the second original guide 332, a light source unit 210, a mirror unit 203, an optical system drive portion (not shown) that causes the light source unit 210 and the mirror unit 203 to move, a collective lens 204, and the first image sensor (here, a CCD) 205*a*.

The platen glass 201 is constituted by a transparent glass plate and its outer circumferential edges are supported by a frame structure 202. The first original guide 331 restricts movement of the original G placed on the platen glass 201 in a direction Y2 opposite to the sub scanning direction Y1. The second original guide 332 restricts movement of the original G placed on the platen glass 201 in an opposite direction X2 (see FIG. 4), which is opposite to the main scanning direction X1.

It should be noted that the original transport portion 300 is openable and closeable with respect to the first original reading portion 200*a* around an axis along the sub scanning direction Y (axially supported by a hinge for example), and its lower surface also serves as an original pressing member that presses from above onto the original G placed on the platen glass 201 of the first original reading portion 200*a*.

The light source unit 210 is provided with the first light source 211*a*, a first mirror 230, and a first support member (not shown). The first light source 211*a* irradiates light toward the original G. The first support member supports the first mirror 230 so that light reflected from the original G is guided to a second mirror 203*a* in the mirror unit 203.

The mirror unit 203 is provided with the second mirror 203*a*, a third mirror 203*b*, and a second support member (not shown). The second support member supports the second mirror 203*a* so that light reflected from the first mirror 230 in the light source unit 210 is guided to the third mirror 203*b*, and supports the third mirror 203*b* so that light reflected from the second mirror 203*a* is guided to the collective lens 204. The collective lens 204 focuses the light from the third mirror 203*b* onto the first image sensor 205*a*. The first image sensor 205*a* converts the light (original image light) from the collective lens 204 to electrical signals as image data.

Furthermore, the optical system drive portion is configured to cause the light source unit 210 to move in the predetermined movement direction (sub scanning reading direction) Y1 at a constant velocity and to cause the mirror unit 203 to move at a movement velocity of ½ the movement velocity of the light source unit 210 in the same movement direction Y1.

Here, the first original reading portion 200*a* supports the moving original method in addition to the secured original method. Accordingly, the optical system drive portion is further configured to cause the light source unit 210 to be positioned in a predetermined home position V below the first reading glass 201*a* during the moving original method.

And the image reading apparatus 100 is provided with the original transport portion 300, which transports the original G in the transport direction Y3 at a constant transport velocity, and the first and second original reading portions 200*a* and 200*b*, which act as original reading portions on both sides with an original transport path 303 in between. It should be noted that the original reading portion may be constituted by only the first original reading portion 200*a*.

The first and second original reading portions 200a and 200b are provided with first and second light sources 211a and 211b, and first and second image sensors 205a and 205b respectively, which read the original G transported by the original transport portion 300 at the predetermined original reading position β1. The first and second original reading portions 200a and 200b are further provided with first and second reading glasses 201a and 201b respectively.

Specifically, the first and second original reading portions 200a and 200b are configured so that the original G transported by the original transport portion 300 in the transport direction Y3 so as to pass over the first and second reading glasses 201a and 201b is irradiated by the first and second light sources 211a and 211b through the first and second reading glasses 201a and 201b while reflected light (original image light) from the original G irradiated by the first and second light sources 211a and 211b is scanned in the main scanning direction X such that an original image is read by the first and second image sensors 205a and 205b.

The second light source 211b is configured to irradiate light toward the original G. The second image sensor 205b converts the reflected light (original image light) from the original G to electrical signals as image data.

The original transport portion 300 is provided with an original tray 301 on which originals G to be transported are placed, a discharge tray 302 arranged below the original tray 301, the original transport path 303 that connects between these, first and second upstream side transport roller pairs 304a and 304b, and first and second downstream side transport roller pairs 305a and 305b.

The original transport path 303 is formed between an inner transport guide 303a and an outer transport guide 303b. The first and second upstream side transport roller pairs 304a and 304b transport the original G on an upstream side of the transport direction Y3 with reference to the original reading position β1. Furthermore, the first and second downstream side transport roller pairs 305a and 305b transport the original G on a downstream side of the transport direction Y3 with reference to the original reading position β1. And the first and second reading glasses 201a and 201b are arranged substantially horizontally so as to demarcate transport walls of the outer transport guide 303b and the inner transport guide 303a respectively.

The original transport portion 300 is further provided with a pickup roller 306, an original paper feeding roller 307, and a separation member (here, a separation roller) 308.

The pickup roller 306 is a component that feeds the originals G that have been placed on the original tray 301 from the original tray 301 into the original transport path 303 along the transport direction Y3.

The original paper feeding roller 307 is arranged on the downstream side from the pickup roller 306 in the transport direction Y3 and transports the original G, which has been fed in by the pickup roller 306, further to the downstream side in the transport direction Y3 while sandwiching the original G with the separation member 308. Arranged in opposition to the original paper feeding roller 307, the separation member 308 sorts (separates) the originals G so that only one sheet of the originals G is transported between itself and the original paper feeding roller 307.

In the thus-configured original transport portion 300, the originals G are transported by the pickup roller 306 between the original paper feeding roller 307 and the separation member 308, and here the originals G are sorted and separated, then transported sheet by sheet due to the original paper feeding roller 307 being rotationally driven. Then it becomes possible to supply the originals G transported by the original paper feeding roller 307 sheet by sheet to the first upstream side transport roller pair 304a by guiding the originals G on the original transport path 303.

Specifically, due to an unshown pickup roller drive portion, the pickup roller 306 can be connected and disconnected with respect to the originals G that are stacked on the original tray 301. Furthermore, the pickup roller 306 is coupled to the original paper feeding roller 307 via an unshown drive transmission portion, which includes an endless belt or the like, so as to rotate in a same direction as the original paper feeding roller 307. When there is a request to read an original G, the pickup roller 306 and the original paper feeding roller 307 are rotationally driven by an unshown original paper feeding drive portion in a direction so as to transport the original G in the transport direction Y3.

The original transport path 303 is formed in a loop shape so that after the original G is transported from the original paper feeding roller 307 then further onward to the second upstream side transport roller pair 304b, the second reading glass 201b, and the second downstream side transport roller pair 305b via a registration roller pair 309, the first upstream side transport roller pair 304a, the first reading glass 201a, and the first downstream side transport roller pair 305a, the original G is discharged to the discharge tray 302.

The present embodiment is configured so that one surface or another surface of the original G can be read by the first original reading portion 201a or the second original reading portion 200b in a one-time transport of the original, and also so that both sides (both surfaces) of the one surface and the other surface of the original G can be read by the first and second original reading portions 200a and 200b in a one-time transport of the original. It should be noted that it is also possible to remove the second original reading portion 200b, then after reading one surface of the original G with the first original reading portion 200a, and after reversing the original G using a reverse transport path 311 and a reverse gate 312 so that the back and front of the original G are inverted, to again read the other surface of the original G using the first original reading portion 200a.

Furthermore, the registration roller pair 309, which is arranged on the downstream side from the original paper feeding roller 307 in the transport direction Y3 and on the upstream side of the first upstream side transport roller pair 304a in the transport direction Y3, is configured to contact and align, in a stopped state, the downstream side (leading edge) edge of the original G in the transport direction Y3, which has been transported by the original paper feeding roller 307, and to be rotationally driven matching the transport timing.

Furthermore, in the present embodiment, a first original detection portion 320a is provided on the original transport path 303, and this detects the original G on the upstream side in the transport direction Y3 with reference to the original reading position β1 of the first original reading portion 200a. Here, the first original detection portion 320a is arranged on a downstream side from the first upstream side transport roller pair 304a in the transport direction Y3 and on an upstream side from the original reading position β1 of the first original reading portion 200a.

Furthermore, in the present embodiment, a second original detection portion 320b is provided on the original transport path 303, and this detects the original G on the upstream side in the transport direction Y3 with reference to the original reading position β1 of the second original reading portion 200b. Here, the second original detection portion 320b is arranged on a downstream side from the second upstream side transport roller pair 304b in the transport direction Y3 and on an upstream side from the original reading position β1 of the second original reading portion 200b. The first and second original detection portions 320a and 320b are set as original detection sensors such as lever-based switches or photosensors or the like.

Furthermore, in the present embodiment, the image reading apparatus 100 is further provided with first and second reading members (one example of reading members) 318a and 318b, which are arranged on an opposite side from the reading side of the original reading position β1 with the first and second reading glasses 201a and 201b in between. The first and second reading members 318a and 318b are read by the first and second image sensors 205a and 205b during a non-transport time of the original. It should be noted that in the present embodiment, the first reading member 318a may also have a function of a transport guide that guides the transported original G at the original reading position β1. Furthermore, in the present embodiment, the image reading apparatus 100 is further provided with a reading member glass 319b, which is arranged on the original transport side surface of the second reading member 318b.

In the above-described image reading apparatus 100, when there is an instruction for reading an original image of the original G using the secured original method, the light source unit 210 scans an image of the original G by irradiating the original G placed on the platen glass 201 with light from the first light source 211a through the platen glass 201 while moving in the movement direction Y1 at a constant velocity, and at the same time as this, the mirror unit 203 moves in the same movement direction Y1 at a movement velocity that is ½ the movement velocity of the light source unit 210.

After the reflected light from the original G, which has been irradiated by the first light source 211a of the light source unit 210, is reflected by the first mirror 230 arranged in the light source unit 210, it undergoes 180° optical path conversion by the second and third mirrors 203a and 203b of the mirror unit 203, and the light that is reflected from the third mirror 203b forms an image on the first image sensor 205a via the collective lens 204, and here the original image light is read and converted to electrical image data.

On the other hand, when there is an instruction for reading an original image of the original G using the moving original method, the original G is transported by the original transport portion 300 in the transport direction Y3 so as to pass over the first reading glass 201a while the light source unit 210 and the mirror unit 203 are stationary at the position V shown in FIG. 2. That is, the originals G placed on the original tray 301 are taken out by the pickup roller 306, then separated sheet by sheet by the original paper feeding roller 307 and the separation member 308, and transported to the original transport path 303. The original G that is transported on the original transport path 303 has its leading edge aligned by the registration roller pair 309 to prevent slanted transport, then is fed with a prescribed reading timing to be transported to the first reading glass 201a via the upstream side transport roller pair 304. At this time, the transport timing of the original G is detected by the first original detection sensor 320a.

Then light from the first light source 211a of the light source unit 210 irradiates through the first reading glass 201a onto one surface of the original G, which has passed over the first reading glass 201a, and is reflected by that one surface. After the light reflected from the one surface of the original G is reflected by the first mirror 230 in a similar manner as in the aforementioned secured original method, it undergoes 180° optical path conversion by the second and third mirrors 203a and 203b of the mirror unit 203 to form an image on the first image sensor 205a via the collective lens 204, and here the original image is read and converted to electrical image data.

The original G for which reading has been completed is withdrawn from above the first reading glass 201a by the downstream side transport roller pair 305a and discharged by way of the original transport path 303 onto the discharge tray 302 by the second downstream side transport roller pair 305b.

Furthermore, in a case of reading both surfaces of the one surface and the other surface of the original G, the original G whose one surface has been read by the first original reading portion 200a is transported to the second reading glass 201b by the second upstream side transport roller pair 304. At this time, the transport timing of the original G is detected by the second original detection sensor 320b.

Then light from the second light source 211b of the reading unit 220 irradiates through the second reading glass 201b onto the other surface of the original G, which has passed over the second reading glass 201b, and is reflected by that other surface. The light that is reflected from the other surface of the original G is incident on the second image sensor 205b of the reading unit 220 and here the original image is read and converted to electrical image data.

The original G for which reading of both surfaces has been completed is withdrawn from above the second reading glass 201b by the second downstream side transport roller pair 305b and discharged onto the discharge tray.

It should be noted that in a case where only the other surface of the original G is to be read, the reading process of the first original reading portion 200a can be stopped in the above-described reading processing.

Furthermore, it is possible to remove the second original detection portion 320b by using the first original detection portion 320a to serve as the second original detection portion 320b. Furthermore, it is also possible to remove at least one of the first original detection portion 320a and the second original detection portion 320b by detecting the transport timing using a rotation timing of the registration roller pair 309.

Description of Characteristic Portions of the Present Invention

Figure 3:
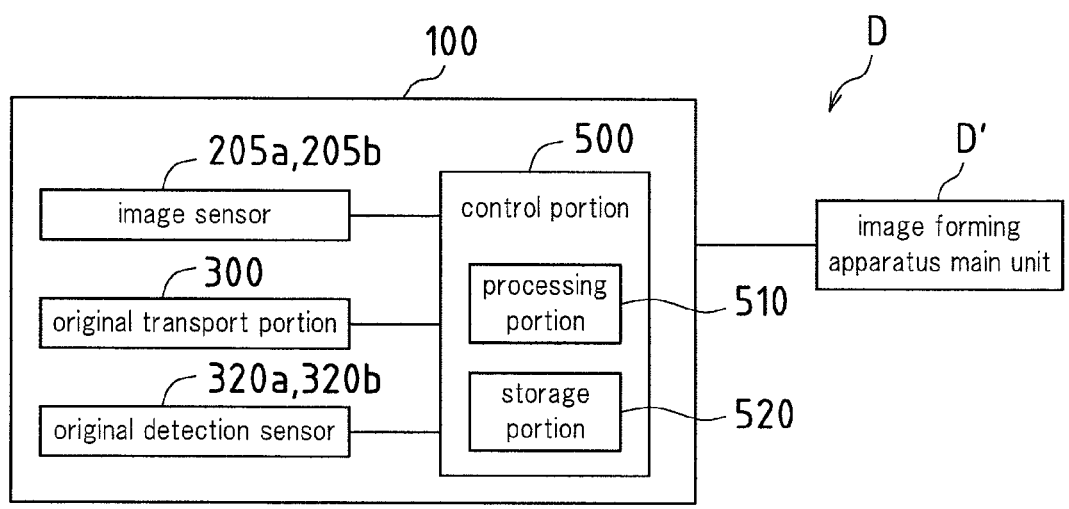
FIG. 3 is a control block diagram centrally showing a control portion in the image reading apparatus shown in FIG. 1 and FIG. 2.

The image reading apparatus 100 shown in FIG. 1 and FIG. 2 is further provided with a control portion 500. FIG. 3 is a control block diagram centrally showing the control portion 500 in the image reading apparatus 100 shown in FIG. 1 and FIG. 2.

As shown in FIG. 3, the control portion 500 is electrically connected to first and second image sensors 205a and 205b of the first and second original reading portions 200a and 200b, the original transport portion 300, and the first and second original detection sensors 320a and 320b. Furthermore, the control portion 500 is connected to an actuator such as a motor that drives the rollers, a sensor such as a detection switch, and an operation panel portion or the like.

The control portion 500 is constituted by a microcomputer including a processing portion 510 such as a CPU, and a storage portion 520 including a memory such as a ROM and a RAM or the like. Specifically, the image reading apparatus 100 is configured so that various configuration elements are controlled by the processing portion 510 of the control portion 500 loading control programs stored in advance in a ROM of the storage portion 520 into a RAM of the storage portion 520, then executing these programs. It should be noted that the control portion 500 is configured to be instructed by a main control portion provided in the image forming apparatus D that controls overall image formation operations.

The image reading apparatus 100 is configured so that the reading commencement time of the original G is adjusted using the adjustment sheet P having the marks Q1 and Q2 (here, rectangular marks). Here, the adjustment sheet P is a sheet in which the image forming apparatus D, which is provided with the image reading apparatus 100, stores in advance in a storage portion (not shown) image data of a printing pattern of the adjustment sheet P, and this image data is used to print the adjustment sheet P in the image forming portion 90.

Figure 4:
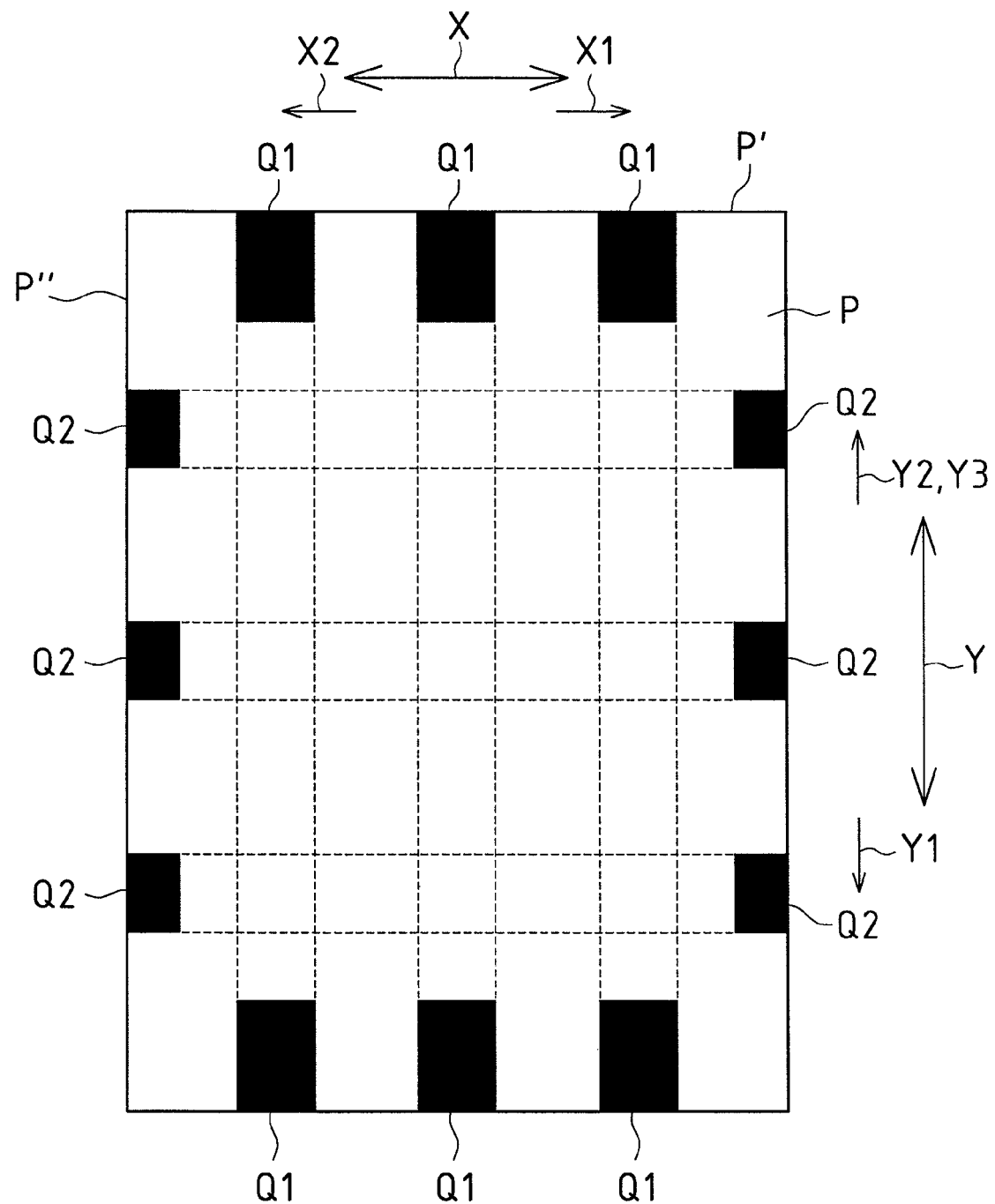
FIG. 4 is a top view showing an adjustment sheet on which marks are formed.

FIG. 4 is a top view showing an adjustment sheet P on which marks Q1 and Q2 are formed. In a case of reading using the secured original method, a first mark Q1 is formed on the adjustment sheet P shown in FIG. 4 including at least an upstream side (leading edge) edge P' in the sub scanning reading direction Y1. Furthermore, in a case of reading using the moving original method, a first mark Q1 is formed on the adjustment sheet P including at least a downstream side (leading edge) edge P' in the transport direction Y3. It should be noted that in a case of reading using the secured original method, a first mark Q1 may also be formed on the adjustment sheet P on at least a downstream side (trailing edge) edge in the sub scanning reading direction Y1. Furthermore, in a case of reading using the moving original method, a first mark Q1 may also be formed on the adjustment sheet P on at least an upstream side (trailing edge) edge in the transport direction Y3.

A second mark Q2 is formed on the adjustment sheet P as shown in FIG. 4 including at least an upstream side (one edge) edge P'' in the main scanning reading direction X1. It should be noted that a second mark Q2 may also be formed on the adjustment sheet P as shown in the example of FIG. 4 on at least a downstream side (other edge) edge in the main scanning reading direction X1.

On the adjustment sheet P, the first and second marks Q1 and Q2 have a brightness (here, black) darker than a predetermined mid-tone brightness, and background areas other than that have a brightness (here, white) of or lighter than the mid-tone brightness.

Specifically, the first mark Q1 is formed at two or more locations (here, three locations) on the adjustment sheet P along the main scanning direction X with a predetermined interval therebetween. Furthermore, the second mark Q2 is formed at two or more locations (here, three locations) on the adjustment sheet P along the sub scanning direction Y with a predetermined interval therebetween.

Here, the first image sensor 205a is a reduction-type image sensor such as a CCD (charge coupled device). Furthermore, here, the second image sensor 205b is a contact type image sensor such as a CIS (contact image sensor).

Figure 5:
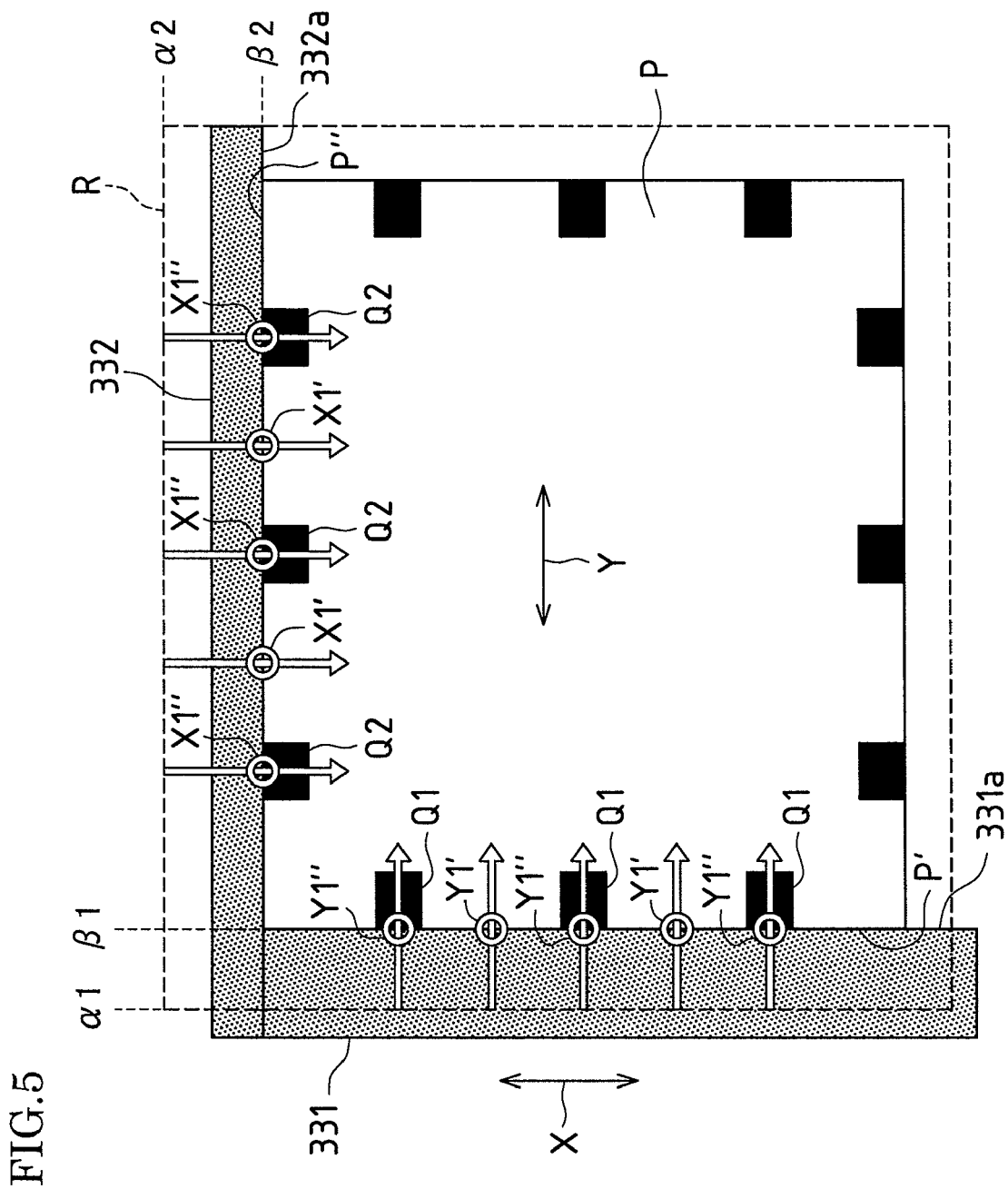
FIG. 5 is a schematic view as seen from above of the first and second original guides whose brightness is comparatively dark.
Figure 6:
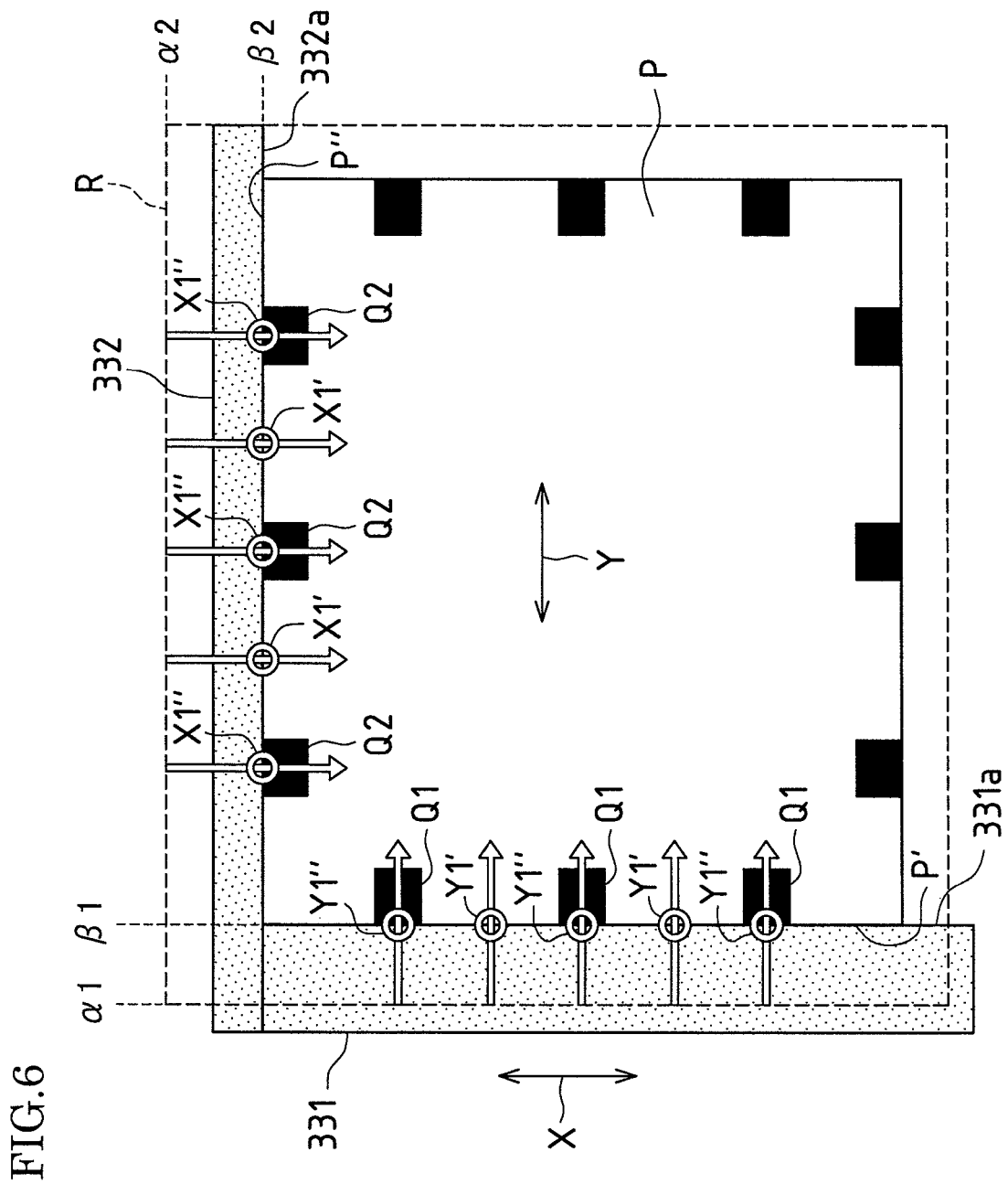
FIG. 6 is a schematic view as seen from above of the first and second original guides whose brightness is comparatively light.

Case of Adjusting Reading Commencement Timings in Sub Scanning Direction in Secured Original Method FIG. 5 is a schematic view as seen from above of the first and second original guides 331 and 332 whose brightness is comparatively dark. Furthermore, FIG. 6 is a schematic view as seen from above of the first and second original guides 331 and 332 whose brightness is comparatively light.

Figure 7:
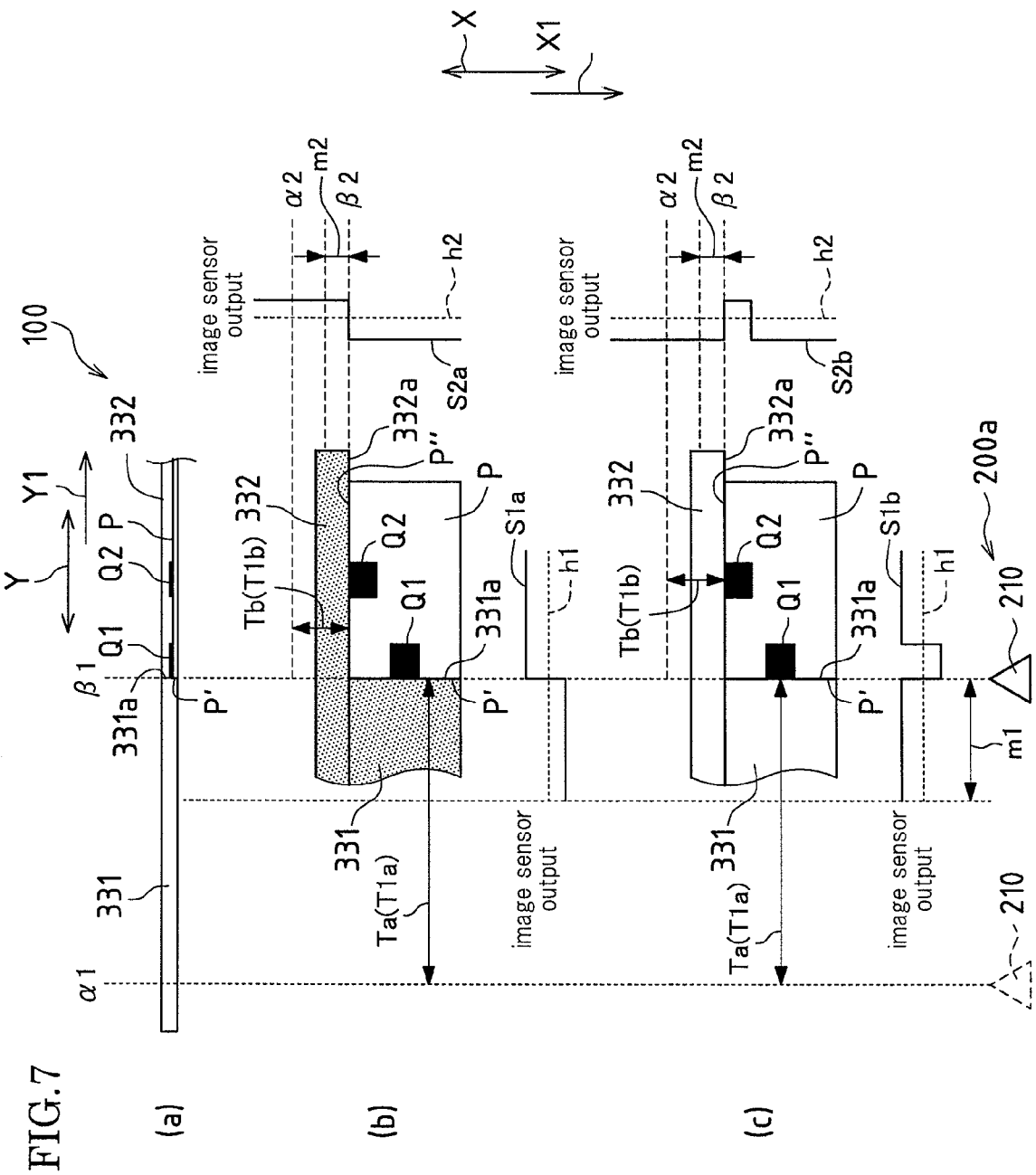
FIG. 7 is a diagram for describing adjustment of reading commencement timings in a secured original method based on first and second marks on an adjustment sheet whose placement position is prescribed by the first and second original guides in the image reading apparatus shown in FIG. 1 and FIG. 2, and is constituted by FIG. 7A, FIG. 7B, and FIG. 7C.

Furthermore, FIG. 7 is a diagram for describing adjustment of reading commencement timings in a secured original method based on the first and second marks Q1 and Q2 on an adjustment sheet P whose placement position is prescribed by the first and second original guides 331 and 332 in the image reading apparatus 100 shown in FIG. 1 and FIG. 2, and is constituted by FIG. 7A, FIG. 7B, and FIG. 7C. FIG. 7A shows a schematic lateral view thereof. FIG. 7B is a schematic view as seen from above of the first and second original guides 331 and 332 whose brightness is comparatively dark, and shows a timing chart of output signals of the first image sensor 205a in this case. FIG. 7C is a schematic view as seen from above of the first and second original guides 331 and 332 whose brightness is comparatively light, and shows a timing chart of output signals of the first image sensor 205a in this case. It should be noted that in FIG. 7, the symbols S1a and S1b indicate the sensor output of the first image sensor 205a in the sub scanning direction Y, and the symbols S2a and S2b indicate the sensor output of the first image sensor 205a in the main scanning direction X.

The control portion 500 shown in FIG. 3 is configured to function as a means including a reading portion and a original reading commencement adjusting portion.

The reading portion is configured to read an image of the original G in the sub scanning direction Y at a predetermined timing from a predetermined scanning position α1 at which the light source unit 210 of the first original reading portion 200a scans in the sub scanning reading direction Y1. That is, the reading portion is configured to commence reading an image of the original G in the sub scanning direction Y after a preset sub scanning reading commencement time Ta has passed from the light source unit 210 at the scanning position α1.

Specifically, the reading portion commences reading an image of the original G in the sub scanning direction Y after a sub scanning reading commencement time Ta has passed, during which the light source unit 210 commences moving in the sub scanning reading direction Y1 at a movement commencement α1, and arrives at the original prescribing edge 331a of the first original guide 331.

It should be noted that the identification of the scanning position α1 by the control portion 500 may be carried out by a position detection portion such as a detection sensor that detects the scanning position α1 of the light source unit 210, and may be carried out by identifying a movement timing of the light source unit 210 in a case where the scanning position α1 is a movement commencement position.

The original reading commencement adjusting portion adjusts the sub scanning reading commencement time Ta using the first mark Q1 on the adjustment sheet P.

That is, the original reading commencement adjusting portion adjusts the sub scanning reading commencement time Ta (here, so that the sub scanning reading commencement time Ta becomes the time T1a for adjusting timing of sub scanning reading) based on the time T1a for adjusting timing of sub scanning reading, which is from the scanning position α1 at which the light source unit 210 of the first original reading portion 200a scans to the sub scanning reading direction Y1 until detection of a difference between the brightness of the first original guide 331 and the brightness of the first mark Q1 on the adjustment sheet P by the first image sensor 205a.

Specifically, the original reading commencement adjusting portion sets an averaged time of each of the times from the movement commencement α1 at which the light source unit 210 moves in the sub scanning reading direction Y1 until the leading edges P' at two or more locations corresponding to the first mark Q1 on the adjustment sheet P are read by the first image sensor 205a as the time T1a for adjusting timing of sub scanning reading.

And the original reading commencement adjusting portion is configured to use the first image sensor 205a of the first original reading portion 200a to read in advance a reading surface (here, a bottom surface) of the first original guide 331 for a predetermined period m1, then change the reading position of the adjustment sheet P in the main scanning direction X in response to the reading result to enable detection of a difference between a brightness of the first original guide 331 and a brightness of the adjustment sheet P by the first image sensor 205a.

Specifically, a predetermined threshold h1 is stored in advance in the storage portion 520. The threshold h1 is set to a value between a reading result of the first mark Q1 by the first image sensor 205a and a reading result of other than the first mark Q1 by the first image sensor 205a (preferably a value in a central range between these).

In a case where the first original guide 331 has a comparatively dark brightness as shown in FIG. 7B, the original reading commencement adjusting portion, upon determining that the reading result of the first original guide 331 by the first image sensor 205a is on a reading result side of the first mark Q1 with reference to the threshold h1 (here, on a side of brightness close to black), reads an edge (here, the leading edge P') of other than the first mark Q1 (here, white) in the main scanning direction X of the adjustment sheet P (see the circular marks Y1' on the arrows in FIG. 5 and the output signal S1a in FIG. 7B).

Furthermore, in a case where the first original guide 331 has a comparatively light brightness as shown in FIG. 7C, the original reading commencement adjusting portion, upon determining that the reading result of the first original guide 331 by the first image sensor 205a is not on a reading result side of the first mark Q1 with reference to the threshold h1 (here, on a side of brightness close to black), reads an edge (here, the leading edge P') of the first mark Q1 (here, black) in the main scanning direction X of the adjustment sheet P (see the circular marks Y1" on the arrows in FIG. 6 and the output signal S1b in FIG. 7C).

It should be noted that the control portion 500 stores position information of the first marks Q1 formed on the adjustment sheet P in advance in the storage portion 520, and identifies in advance positions of the first mark Q1 and positions of other than the first mark Q1.

In this manner, with the image reading apparatus 100 and the image forming apparatus D according to an embodiment of the present invention, the first original guide 331 is read by the first image sensor 205a, then the reading position of the adjustment sheet P in the main scanning direction X is changed in response to the reading result thereof to enable detection of a difference between a brightness of the first original guide 331 and a brightness of the adjustment sheet P by the first image sensor 205a, and therefore the reading timing of the original G can be reliably adjusted in the sub scanning direction Y even when the brightness of the first original guide 331 varies due to product specifications without changing the control configuration for each product.

Moreover, when it is determined that the reading result of the first original guide 331 by the first image sensor 205a is on a reading result side of the first mark Q1 with reference to the threshold h1 (here, on a side of brightness close to black), the leading edges P' of other than the first marks Q1 (here, white) on the adjustment sheet P in the main scanning direction X are read, and therefore, as shown in FIG. 5 and FIG. 7B, when the brightness of the first original guide 331 (for example, a brightness close to black) and the brightness of the first mark Q1 of the adjustment sheet P (here, black) are comparatively similar, a difference can be reliably identified by the first image sensor 205a between the brightness of the first original guide 331 (for example, a brightness close to black) and a brightness of other than the first marks Q1 of the adjustment sheet (here, white) as shown by the circular marks Y1' of FIG. 5 and the sensor output S1a of FIG. 7B.

Further still, when it is determined that the reading result of the first original guide 331 by the first image sensor 205a is not on a reading result side of the first mark Q1 with reference to the threshold h1 (here, on a side of brightness close to black), the leading edges P' of the first marks Q1 (here, black) on the adjustment sheet P in the main scanning direction X are read, and therefore, as shown in FIG. 6 and FIG. 7C, when the brightness of the first original guide 331 (for example, a brightness close to white) and the brightness of the first mark Q1 of the adjustment sheet P (here, black) are comparatively different, a difference can be reliably identified by the first image sensor 205a between the brightness of the first original guide 331 (for example, a brightness close to white) and a brightness of the first marks Q1 of the adjustment sheet (here, black) as shown by the circular marks Y1" of FIG. 6 and the sensor output S1b of FIG. 7C).

Case of Adjusting Reading Commencement Timings in Main Scanning Direction in Secured Original Method As shown in FIGS. 5 to 7, the reading portion is further configured to read an image of the original G in the main scanning direction X at a predetermined timing from a predetermined scanning position α2 at which the first image sensor 205a of the first original reading portion 200a scans in the main scanning reading direction X1. That is, the reading portion is configured to commence reading an image of the original G in the main scanning direction X after a preset main scanning reading commencement time Tb has passed from the first image sensor 205a at the scanning position α2.

Specifically, the reading portion commences reading an image of the original G in the main scanning direction X after a main scanning reading commencement time Tb has passed, during which the first image sensor 205a scans in the main scanning reading direction X1 from a scanning commencement α2 until the original prescribing edge 332a of the second original guide 332.

The original reading commencement adjusting portion further adjusts the main scanning reading commencement time Tb using the second mark Q2 on the adjustment sheet P. In this way, a center position of the original G in the main scanning direction X (center reference of the original G) can be adjusted.

That is, the original reading commencement adjusting portion further adjusts the main scanning reading commencement time Tb (here, so that the main scanning reading commencement time Tb becomes the time T1b for adjusting timing of main scanning reading) based on the time T1b for adjusting timing of main scanning reading, which is from the scanning position α2 at which the first image sensor 205a of the first original reading portion 200a scans in the main scanning reading direction X1 until detection of a difference between the brightness of the second original guide 332 and the brightness of the second mark Q2 on the adjustment sheet P by the first image sensor 205a.

Specifically, the original reading commencement adjusting portion sets an averaged time of each of the times from the scanning commencement α2 of the first image sensor 205a until the edges P''' at two or more locations corresponding to the second mark Q2 on the adjustment sheet P are read by the first image sensor 205a as the time T1b for adjusting timing of main scanning reading.

And the original reading commencement adjusting portion is further configured to use the first image sensor 205a of the first original reading portion 200a to read in advance a reading surface (here, a bottom surface) of the second original guide 332 for a predetermined period m2, then change the reading position of the adjustment sheet P in the sub scanning direction Y in response to the reading result thereof to enable detection of a difference between a brightness of the second original guide 332 and a brightness of the adjustment sheet P by the first image sensor 205a.

Specifically, a predetermined threshold h2 is stored in advance in the storage portion 520. The threshold h2 is set to a value between a reading result of the second mark Q2 by the first image sensor 205a and a reading result of other than the second mark Q2 by the first image sensor 205a (preferably a value in a central range between these).

Here, the reading of the edges P''' of the adjustment sheet P in the main scanning direction X is carried out by temporarily storing image data of the adjustment sheet P read by the first image sensor 205a in the storage portion 520 then using the image data of the adjustment sheet P stored in the storage portion 520. It should be noted that in FIG. 5 and FIG. 6, a dashed line indicates an image data region R of the adjustment sheet P read by the first image sensor 205a.

In a case where the second original guide 332 has a comparatively dark brightness as shown in FIG. 7B, the original reading commencement adjusting portion, upon determining that the reading result of the second original guide 332 by the first image sensor 205a is on a reading result side of the second mark Q2 with reference to the threshold h2 (here, on a side of brightness close to black), reads the edge P''' of other than the second mark Q2 (here, white) in the sub scanning direction Y of the adjustment sheet P in the image data region R of the adjustment sheet P (see the circular marks X1' on the arrows in FIG. 5 and the output signal S2a in FIG. 7B).

Furthermore, in a case where the second original guide 332 has a comparatively light brightness as shown in FIG. 7C, the original reading commencement adjusting portion, upon determining that the reading result of the second original guide 332 by the first image sensor 205a is not on a reading result side of the second mark Q2 with reference to the threshold h2 (here, on a side of brightness close to black), reads the edge P''' of the second mark Q2 (here, black) in the sub scanning direction Y of the adjustment sheet P in the image data region R of the adjustment sheet P (see the circular marks X1" on the arrows in FIG. 6 and the output signal S2b in FIG. 7C).

It should be noted that the control portion 500 stores position information of the second marks Q2 formed on the adjustment sheet P in advance in the storage portion 520, and identifies in advance positions of the second mark Q2 and positions of other than the second mark Q2.

In this manner, with the image reading apparatus 100 and the image forming apparatus D according to an embodiment of the present invention, the second original guide 332 is read by the first image sensor 205a, then the reading position of the adjustment sheet P in the sub scanning direction Y is changed in response to the reading result thereof to enable detection of a difference between a brightness of the second original guide 332 and a brightness of the adjustment sheet P by the first image sensor 205a, and therefore the reading timing of the original G can be reliably adjusted in the main scanning direction X even when the brightness of the second original guide 332 varies due to product specifications without changing the control configuration for each product.

Moreover, when it is determined that the reading result of the second original guide 332 by the first image sensor 205a is on a reading result side of the second mark Q2 with reference to the threshold h2 (here, on a side of brightness close to black), the leading edges P''' of other than the second marks Q2 (here, white) on the adjustment sheet P in the sub scanning direction Y are read, and therefore, as in the example shown in FIG. 7B, when the brightness of the second original guide 332 (for example, a brightness close to black) and the brightness of the second mark Q2 of the adjustment sheet P (here, black) are comparatively similar, a difference can be reliably identified by the first image sensor 205a between the brightness of the second original guide 332 (for example, a brightness close to black) and a brightness of other than the second marks Q2 of the adjustment sheet (here, white) as shown by the sensor output S2a of FIG. 7B.

Further still, when it is determined that the reading result of the second original guide 332 by the first image sensor 205a is not on a reading result side of the second mark Q2 with reference to the threshold h2 (here, on a side of brightness close to black), the leading edges P''' of other than the second marks Q2 (here, black) on the adjustment sheet P in the sub scanning direction Y are read, and therefore, as shown in FIG. 7C, when the brightness of the second original guide 332 (for example, a brightness close to white) and the brightness of the second mark Q2 of the adjustment sheet P (here, black) are comparatively different, a difference can be reliably identified by the first image sensor 205a between the brightness of the second original guide 332 (for example, a brightness close to white) and a brightness of other than the second marks Q2 of the adjustment sheet (here, black) as shown by the sensor output S2b of FIG. 7C.

Figure 8:
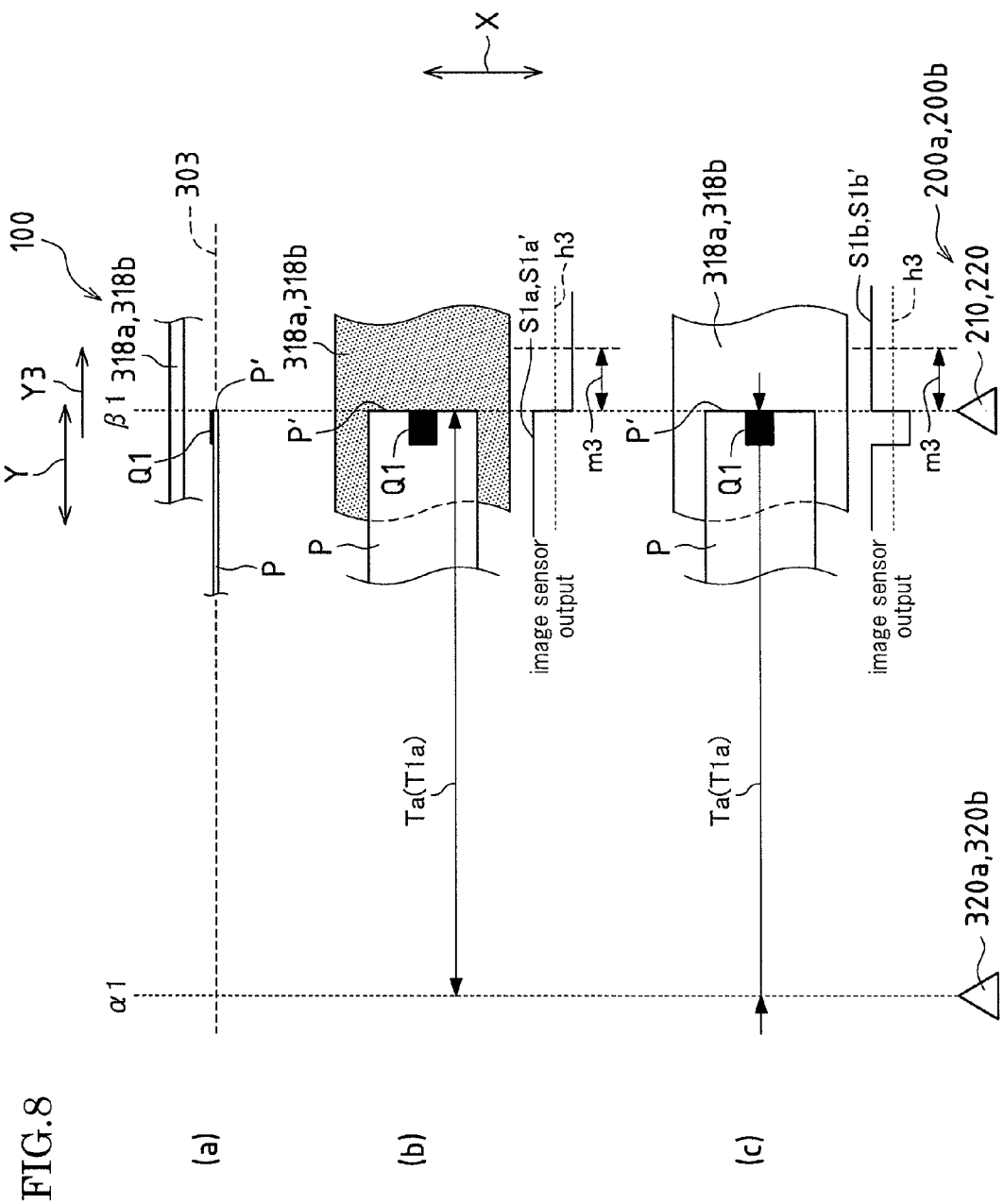
FIG. 8 is a diagram for describing adjustment of reading commencement timings in a moving original method based on a first mark on an adjustment sheet transported in the image reading apparatus shown in FIG. 1 and FIG. 2, and is constituted by FIG. 8A, FIG. 8B, and FIG. 8C.
Figure 9:
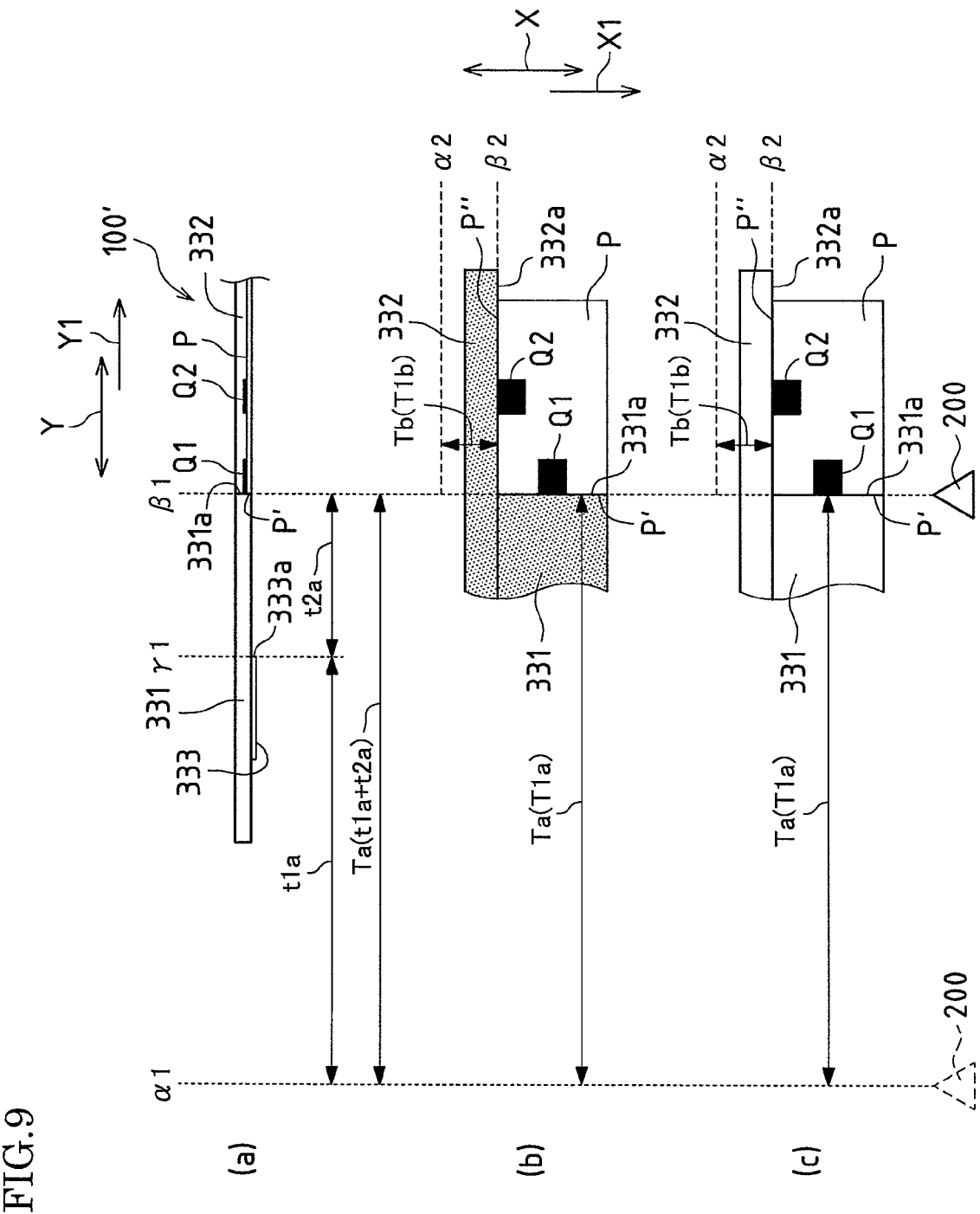
FIG. 9 is a diagram for describing conventional adjustment of reading commencement timings based on first and second marks on an adjustment sheet whose placement position is prescribed by first and second original guides in an image reading apparatus of the secured original method, and is constituted by FIG. 9A, FIG. 9B, and FIG. 9C.
Figure 10:
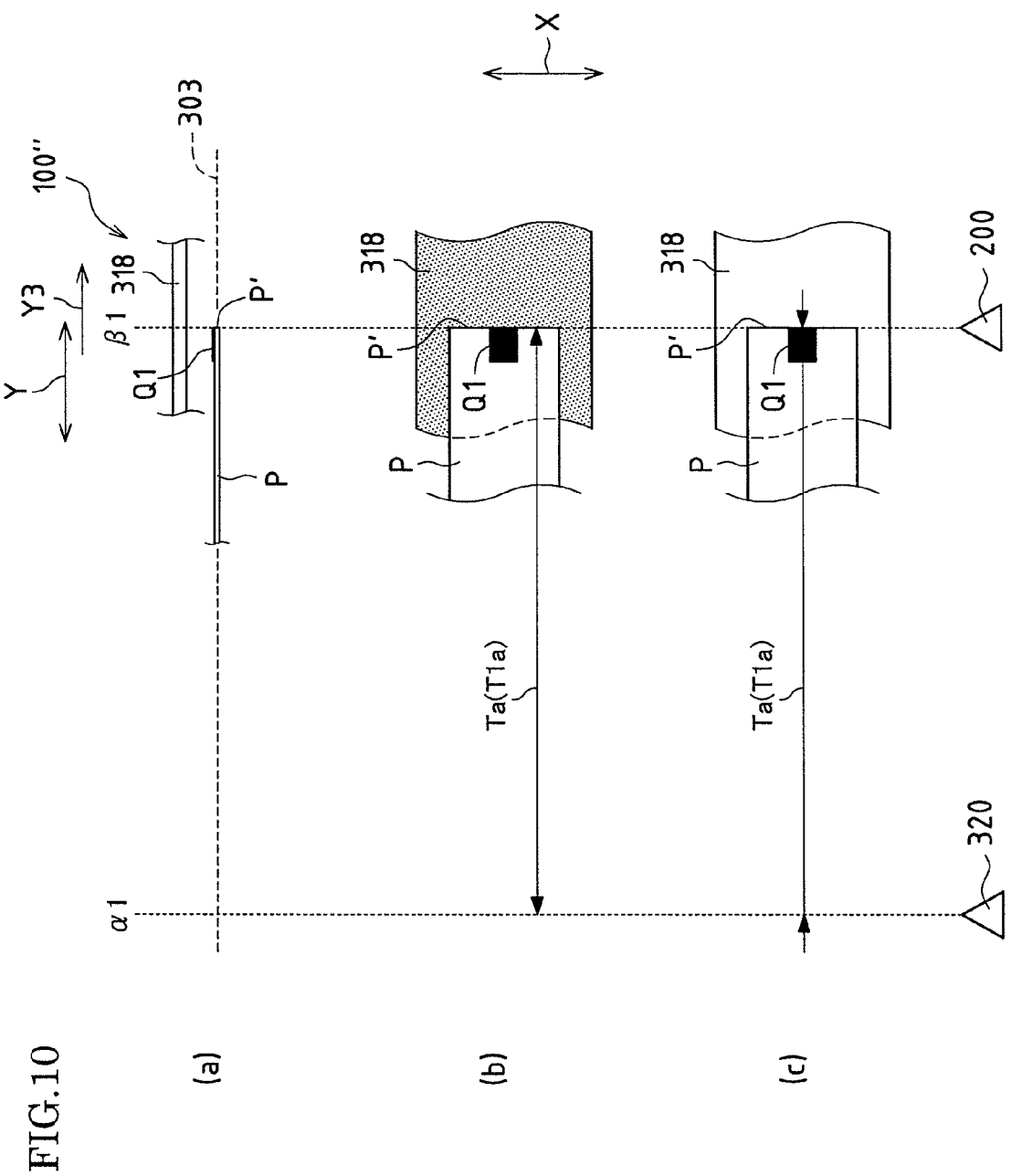
FIG. 10 is a diagram for describing conventional adjustment of reading commencement timings based on a mark on an adjustment sheet transported in an image reading apparatus of the moving original method, and is constituted by FIG. 10A, FIG. 10B, and FIG. 10C.

Case of Adjusting Reading Commencement Timings in Sub Scanning Direction in Moving Original Method FIG. 8 is a diagram for describing adjustment of reading commencement timings in a moving original method based on a first mark Q1 on the adjustment sheet P transported in the image reading apparatus 100 shown in FIG. 1 and FIG. 2, and is constituted by FIG. 8A, FIG. 8B, and FIG. 8C. FIG. 8A shows a schematic lateral view thereof. FIG. 8B is a schematic view as seen from below the first and second reading members 318a and 318b whose brightness is comparatively dark, and shows a timing chart of output signals of the first and second image sensors 205a and 205b in this case. FIG. 8C is a schematic view as seen from below the first and second reading members 318a and 318b whose brightness is comparatively light, and shows a timing chart of output signals of the first and second image sensors 205a and 205b in this case.

It should be noted that in FIG. 8, the first original detection sensor 320a, the first original reading portion 200a, and the first reading member 318a, as well as the second original detection sensor 320b, the second original reading portion 200b, and the second reading member 318b, are represented in a single diagram. Furthermore, in FIG. 8, the symbols S1a and S1b indicate the sensor output of the first image sensor 205a in the sub scanning direction Y, and the symbols S1a' and S1b' indicate the sensor output of the second image sensor 205b in the sub scanning direction Y.

The first and second original detection sensors 320a and 320b can detect a transport timing (here, a leading edge timing) of the original G and the adjustment sheet P at an upstream side of the transport direction Y3 of the original reading position β1. In the present embodiment, the first and second original detection sensors 320a and 320b are configured to detect a leading edge G' of the original G and a leading edge P' of the adjustment sheet P, which are transported by the original transport portion 300, at a predetermined original detection position α1 on an upstream side from the original reading position β1 in the transport direction Y3.

A reading portion is configured to read an image of the original G at a predetermined reading timing in the sub scanning direction Y after detecting the transport timing of the original G (here, the leading edge G') on an upstream side α1 of the transport direction Y3 by the first and second original detection sensors 320a and 320b with reference to the original reading position β1. That is, the reading portion is configured to commence reading of an image of the original G in the sub scanning direction Y after a preset sub scanning reading commencement time Ta has passed from detecting the transport timing of the original G (here, the leading edge G') on the upstream side α1 of the transport direction Y3 by the first and second original detection sensors 320a and 320b with reference to the original reading position β1.

Specifically, the reading portion commences reading of an image of the original G in the sub scanning direction Y after the sub scanning reading commencement time Ta has passed, during which the leading edge G' of the original G is transported from a detection position α1 of the transport timing by the first and second original detection sensors 320a and 320b until the original reading position β1 by the first and second image sensors 205a and 205b of the first and second original reading portions 200a and 200b.

The original reading commencement adjusting portion adjusts the sub scanning reading commencement time Ta using the first mark Q1 on the adjustment sheet P.

That is, the original reading commencement adjusting portion adjusts the sub scanning reading commencement time Ta (here, so that the sub scanning reading commencement time Ta becomes the time T1a for adjusting timing of sub scanning reading) based on the time T1a for adjusting timing of sub scanning reading, which is from detecting the leading edge P' of the adjustment sheet P, which is transported in the transport direction Y3 by the original transport portion 300 on an upstream side α1 of the transport direction Y3 with reference to the original reading position β1, by the first and second original detection sensors 320a and 320b, until a difference is detected by the first and second image sensors 205a and 205b between the brightness of the first and second reading members 318a and 318b and the brightness of the first mark Q1 on the adjustment sheet P.

Specifically, the original reading commencement adjusting portion sets an averaged time of each of the times from detecting the leading edge P' of the adjustment sheet P using the first and second original detection sensors 320a and 320b until reading the leading edge P' at two or more locations corresponding to the first mark Q1 on the adjustment sheet P using the first and second image sensors 205a and 205b as the time T1a for adjusting timing of sub scanning reading.

And the original reading commencement adjusting portion is configured to use the first and second image sensors 205a and 205b of the first and second original reading portions 200a and 200b to read in advance a reading surface (here, a bottom surface) of the first reading member 318a and a reading surface (here, a top surface) of the second reading member 318b for a predetermined period m3, then change the reading position of the adjustment sheet P in the main scanning direction X in response to the reading result thereof to enable detection of a difference between a brightness of the first and second reading members 318a and 318b and a brightness of the adjustment sheet P by first and second image sensors 205a and 205b.

Specifically, a predetermined threshold h3 is stored in advance in the storage portion 520. The threshold h3 is set to a value between reading results of the first mark Q1 by the first and second image sensors 205a and 205b and reading results of other than the first mark Q1 by the first and second image sensors 205a and 205b (preferably a value in a central range between these).

In a case where the first and second reading members 318a and 318b have a comparatively dark brightness as shown in FIG. 8B, the original reading commencement adjusting portion, upon determining that the reading result of the first and second reading members 318a and 318b by the first and second image sensors 205a and 205b are on a reading result side of the first mark Q1 with reference to the threshold h3 (here, on a side of brightness close to black), reads an edge (here, the leading edge P') of other than the first mark Q1 (here, white) in the main scanning direction X of the adjustment sheet P (see the output signals S1a and S1a' in FIG. 8B).

Furthermore, in a case where the first and second reading members 318a and 318b have a comparatively light brightness as shown in FIG. 8C, the original reading commencement adjusting portion, upon determining that the reading result of the first and second reading members 318a and 318b by the first and second image sensors 205a and 205b are not on a reading result side of the first mark Q1 with reference to the threshold h3 (here, on a side of brightness close to black), reads an edge (here, the leading edge P') of the first mark Q1 (here, black) in the main scanning direction X of the adjustment sheet P (see the output signals S1b and S1b' in FIG. 8C).

In this manner, with the image reading apparatus 100 and the image forming apparatus D according to an embodiment of the present invention, the first and second reading members 318a and 318b are read by first and second image sensors 205a and 205b, then the reading position of the adjustment sheet P in the main scanning direction X is changed in response to the reading result thereof to enable detection of a difference between a brightness of the first and second reading members 318a and 318b and a brightness of the adjustment sheet P by the first and second image sensors 205a and 205b, and therefore the reading timing of the original G can be reliably adjusted in the sub scanning direction Y even when the brightness of the first and second reading members 318a and 318b varies due to product specifications without changing the control configuration for each product.

Moreover, when it is determined that the reading results of the first and second reading members 318a and 318b by the first and second image sensors 205a and 205b are on a reading result side of the first mark Q1 with reference to the threshold h3 (here, on a side of brightness close to black), the leading edges P' of other than the first marks Q1 (here, white) on the adjustment sheet P in the main scanning direction X are read, and therefore, as shown in FIG. 8B, when the brightness of the first and second reading members 318a and 318b (for example, a brightness close to black) and the brightness of the first mark Q1 of the adjustment sheet P (here, black) are comparatively similar, a difference can be reliably identified by the first and second image sensors 205a and 205b between the brightness of the first and second reading members 318a and 318b (for example, a brightness close to black) and a brightness of other than the first marks Q1 of the adjustment sheet (here, white) as shown by the sensor output S1a and S1a' of FIG. 8B.

Further still, when it is determined that the reading results of the first and second reading members 318a and 318b by the first and second image sensors 205a and 205b are not on a reading result side of the first mark Q1 with reference to the threshold h3 (here, on a side of brightness close to black), the leading edges P' of the first marks Q1 (here, black) on the adjustment sheet P in the main scanning direction X are read, and therefore, as shown in FIG. 8C, when the brightness of the first and second reading members 318a and 318b (for example, a brightness close to white) and the brightness of the first mark Q1 of the adjustment sheet P (here, black) are comparatively different, a difference can be reliably identified by the first and second image sensors 205a and 205b between the brightness of the first and second reading members 318a and 318b (for example, a brightness close to white) and a brightness of the first marks Q1 of the adjustment sheet (here, black) as shown by the sensor output S1b and S1b' of FIG. 8C.

Further still, in the present embodiment, in a case of adjusting the reading commencement timing for a secured original method and a case of adjusting the reading commencement timing for a moving original method, at least two or more of the first and second marks Q1 and Q2 on the adjustment sheet P are provided with intervals therebetween, and therefore discrepancies in the reading timings can be equalized by averaging the reading times of the first and second marks Q1 and Q2 using the first and second image sensors 205a and 205b.

It should be noted that the present invention can be embodied and practiced in other different forms without departing from the spirit, purport or essential characteristics thereof. Therefore, the above-described embodiments are considered in all respects as illustrative and not restrictive. The scope of the invention is indicated by the appended claims rather than by the foregoing description. All variations and modifications falling within the equivalency range of the appended claims are intended to be embraced therein.

What is claimed is:

1. An image reading apparatus, comprising:
   an original reading portion that reads an image of an original placed on an original table by moving toward one side of a sub scanning direction while scanning in a main scanning direction orthogonal to the sub scanning direction,
   a first original guide that prescribes a placement position of an original in the sub scanning direction, and
   an original reading commencement adjusting portion that adjusts a reading commencement timing of the original in the sub scanning direction using an adjustment sheet having a first mark formed on at least an edge in the sub scanning direction,
   wherein the original reading commencement adjusting portion reads the first original guide using the original reading portion and, based on a reading result thereof, changes a reading position of the adjustment sheet in the main scanning direction to enable detection by the original reading portion of a difference between a brightness of the first original guide and a brightness of the adjustment sheet.

2. The image reading apparatus according to claim 1,
   wherein the original reading commencement adjusting portion adjusts a reading commencement timing of the original in the sub scanning direction based on a time for adjusting timing of sub scanning reading, which is from a predetermined scanning position at which the original reading portion scans to one side of the sub scanning direction until when a difference is detected by the original reading portion between a brightness of the first original guide and a brightness of the adjustment sheet.

3. The image reading apparatus according to claim 1,
   further comprising a second original guide that prescribes a placement position of an original in the main scanning direction,
   wherein the adjustment sheet further comprises a second mark formed on at least an edge in the main scanning direction, and
   the original reading commencement adjusting portion further adjusts a reading commencement timing of the original in the main scanning direction using the adjustment sheet, reads the second original guide using the original reading portion and, based on a reading result thereof, changes a reading position of the adjustment sheet in the sub scanning direction to enable detection by the original reading portion of a difference between a brightness of the second original guide and a brightness of the adjustment sheet.

4. The image reading apparatus according to claim 3,
   wherein the original reading commencement adjusting portion adjusts a reading commencement timing of the original in the main scanning direction based on a time for adjusting timing of main scanning reading, which is from a predetermined scanning position at which the original reading portion scans to one side of the main scanning direction until when a difference is detected by the original reading portion between a brightness of the second original guide and a brightness of the adjustment sheet.

5. The image reading apparatus according to claim 1,
   wherein a threshold is set in advance, which is a value between a reading result of the first mark of the adjustment sheet by the original reading portion and a reading result of other than the first mark of the adjustment sheet by the original reading portion, and
   the original reading commencement adjusting portion, upon determining that a reading result of the first original guide by the original reading portion is on a reading result side of the first mark with reference to the threshold, reads an edge other than the first mark of the adjustment sheet.

6. The image reading apparatus according to claim 1,
   wherein a threshold is set in advance, which is a value between a reading result of the first mark of the adjustment sheet by the original reading portion and a reading result of other than the first mark of the adjustment sheet by the original reading portion, and
   the original reading commencement adjusting portion, upon determining that a reading result of the first original guide by the original reading portion is not on a reading result side of the first mark with reference to the threshold, reads an edge of the first mark of the adjustment sheet.

7. An image reading apparatus, comprising:
   an original reading portion that reads an image of an original, which is transported toward one side of a sub scanning direction, at a predetermined original reading position by scanning in a main scanning direction orthogonal to the sub scanning direction,
   a reading member arranged on an opposite side from a side of reading by the original reading portion through an original transport path, and
   an original reading commencement adjusting portion that adjusts a reading commencement timing of the original in the sub scanning direction using an adjustment sheet having a mark formed on at least an edge in the sub scanning direction,
   wherein the original reading commencement adjusting portion reads the reading member using the original reading portion and, based on a reading result thereof, changes a reading position of the adjustment sheet in the main scanning direction to enable detection by the original reading portion of a difference between a brightness of the reading member and a brightness of the adjustment sheet.

8. The image reading apparatus according to claim 7,
   wherein the original reading commencement adjusting portion adjusts a reading commencement timing of the original in the sub scanning direction based on a time for adjusting timing of sub scanning reading, which is from detection of a transport timing of the adjustment sheet at an upstream side from the original reading position in the transport direction of the original toward one side of the sub scanning direction until when a difference is detected by the original reading portion between a brightness of the reading member and a brightness of the adjustment sheet.

9. The image reading apparatus according to claim 7,
wherein a threshold is set in advance, which is a value between a reading result of the mark of the adjustment sheet by the original reading portion and a reading result of other than the mark of the adjustment sheet by the original reading portion, and the original reading commencement adjusting portion, upon determining that a reading result of the reading member by the original reading portion is on a reading result side of the mark with reference to the threshold, reads an edge other than the mark of the adjustment sheet.

10. The image reading apparatus according to claim 7,
wherein a threshold is set in advance, which is a value between a reading result of the mark of the adjustment sheet by the original reading portion and a reading result of other than the mark of the adjustment sheet by the original reading portion, and the original reading commencement adjusting portion, upon determining that a reading result of the reading member by the original reading portion is not on a reading result side of the mark with reference to the threshold, reads an edge of the mark of the adjustment sheet.

11. The image reading apparatus according to claim 7,
wherein the original reading portion is provided on both sides of the original transport path with the original transport path in between.

12. The image reading apparatus according to claim 1,
wherein on the adjustment sheet, the first mark has a brightness darker than a predetermined mid-tone brightness, and other than the mark has a brightness of or lighter than the mid-tone brightness.

13. The image reading apparatus according to claim 1,
wherein on the adjustment sheet, at least two or more of the first marks are provided with an interval therebetween.

14. The image reading apparatus according to claim 1,
wherein the adjustment sheet is a sheet printed by an image forming apparatus that is provided with the image reading apparatus.

15. An image forming apparatus provided with an image reading apparatus according to claim 1.

16. The image reading apparatus according to claim 7,
wherein on the adjustment sheet, the mark has a brightness darker than a predetermined mid-tone brightness, and other than the mark has a brightness of or lighter than the mid-tone brightness.

17. The image reading apparatus according to claim 7,
wherein on the adjustment sheet, at least two or more of the marks are provided with an interval therebetween.

18. The image reading apparatus according to claim 7,
wherein the adjustment sheet is a sheet printed by an image forming apparatus that is provided with the image reading apparatus.

19. An image forming apparatus provided with an image reading apparatus according to claim 7.

* * * * *